United States Patent
Sato

(10) Patent No.: US 11,962,254 B2
(45) Date of Patent: Apr. 16, 2024

(54) DRIVE CIRCUIT, ELECTRONIC APPARATUS, AND METHOD OF CONTROLLING DRIVE CIRCUIT

(71) Applicant: SONY CORPORATION, Tokyo (JP)

(72) Inventor: Masahiro Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 858 days.

(21) Appl. No.: 16/976,750

(22) PCT Filed: Dec. 14, 2018

(86) PCT No.: PCT/JP2018/046050
§ 371 (c)(1),
(2) Date: Aug. 29, 2020

(87) PCT Pub. No.: WO2019/171701
PCT Pub. Date: Sep. 12, 2019

(65) Prior Publication Data
US 2021/0044219 A1    Feb. 11, 2021

(30) Foreign Application Priority Data
Mar. 7, 2018    (JP) .................. 2018-040576

(51) Int. Cl.
*H02N 2/06*    (2006.01)
*H02M 3/00*    (2006.01)

(52) U.S. Cl.
CPC .............. *H02N 2/065* (2013.01); *H02M 3/00* (2013.01); *H02N 2/06* (2013.01)

(58) Field of Classification Search
CPC ............ H02N 2/06; H02N 2/065; H02M 3/00
(Continued)

(56) References Cited

U.S. PATENT DOCUMENTS

2006/0097707 A1* 5/2006 Inoshita ............. H02M 3/1582
                                                          323/222
2014/0265945 A1* 9/2014 Deboy .................. B60L 58/12
                                                          318/139
(Continued)

FOREIGN PATENT DOCUMENTS

| JP | 04-368485 A | 12/1992 |
|---|---|---|
| JP | 2006-136125 A | 5/2006 |
| JP | 2015-159724 A | 9/2015 |

OTHER PUBLICATIONS

International Search Report and Written Opinion of PCT Application No. PCT/JP2018/046050, dated Feb. 26, 2019, 06 pages of ISRWO.

*Primary Examiner* — Erick D Glass
(74) *Attorney, Agent, or Firm* — CHIP LAW GROUP

(57) ABSTRACT

It is an object of the present invention to reduce power consumption in a drive circuit that drives a capacitive load. A drive circuit includes: a positive-side circuit; and a negative-side circuit. The positive-side circuit causes current supplied from a power source to a predetermined node to flow to a positive-side terminal of a capacitive load in a first drive mode and causes current from the capacitive load to flow from the positive-side terminal to the predetermined node in a second drive mode. The negative-side circuit causes current from a negative-side terminal of the capacitive load to flow to the predetermined node in the first drive mode and causes current supplied from the power supply to the predetermined node to flow to the negative-side terminal in the second drive mode.

11 Claims, 20 Drawing Sheets

(58) Field of Classification Search
USPC .......................................................... 318/114
See application file for complete search history.

(56) References Cited

U.S. PATENT DOCUMENTS

| | | | |
|---|---|---|---|
| 2016/0065064 A1* | 3/2016 | Zojer ................... | H03K 17/107 |
| | | | 323/271 |
| 2016/0261194 A1* | 9/2016 | Lam ...................... | H02M 3/156 |
| 2019/0025861 A1* | 1/2019 | Hung ...................... | G05F 1/465 |
| 2020/0099295 A1* | 3/2020 | Moctezuma ..... | H03K 17/08142 |

* cited by examiner

| Comparison result CMPp | Output of positive-side control circuit | | |
|---|---|---|---|
| | UPp1 | DWp1 | UPp2 |
| L (Second drive mode) | H | L | PWM signal (boost) |
| H (First drive mode) | L | PWM signal (step-down) | L |

| Comparison result CMPn | Output of negative-side control circuit | | |
|---|---|---|---|
| | UPn1 | DWn1 | UPn2 |
| L (First drive mode) | H | L | PWM signal (boost) |
| H (Second drive mode) | L | PWM signal (step-down) | L |

FIG.8

| Comparison result CMPp | Output of positive-side control circuit | | | |
|---|---|---|---|---|
| | UPp1 | DWp1 | DWp2 | UPp2 |
| L (Second drive mode) | H | L | L | PWM signal (boost) |
| H (First drive mode) | L | PWMa signal (step-down) | PWMb signal (step-down) | L |

FIG.15

| Comparison result CMPn | Output of negative-side control circuit | | | |
|---|---|---|---|---|
| | UPn1 | DWn1 | DWn2 | UPn2 |
| L (First drive mode) | H | L | L | PWM signal (boost) |
| H (Second drive mode) | L | PWMa signal (step-down) | PWMb signal (step-down) | L |

FIG.16

| Comparison result CMPp | Output of positive-side control circuit ||||
|---|---|---|---|---|
| | UPp1 | DWp1 | DWp2 | UPp2 |
| L (Second drive mode) | PWMb (boost) | L | L | PWMa (boost) |
| H (First drive mode) | L | PWMa signal (step-down) | PWMb signal (step-down) | L |

FIG.20

| Comparison result CMPn | Output of negative-side control circuit ||||
|---|---|---|---|---|
| | UPn1 | DWn1 | DWn2 | UPn2 |
| L (First drive mode) | PWMb (boost) | L | L | PWMa (boost) |
| H (Second drive mode) | L | PWMa signal (step-down) | PWMb signal (step-down) | L |

FIG.21

| Comparison result CMPp | Output of positive-side control circuit | |
|---|---|---|
| | CTLp1 | CTLp2 |
| L (Second drive mode) | PWMb signal (boost) | PWMa signal (boost) |
| H (First drive mode) | PWMa signal (step-down) | PWMb signal (step-down) |

FIG.24

| Comparison result CMPn | Output of negative-side control circuit | |
|---|---|---|
| | CTLn1 | CTLn2 |
| L (First drive mode) | PWMb signal (boost) | PWMa signal (boost) |
| H (Second drive mode) | PWMa signal (step-down) | PWMb signal (step-down) |

FIG.25

DRIVE CIRCUIT, ELECTRONIC APPARATUS, AND METHOD OF CONTROLLING DRIVE CIRCUIT

CROSS REFERENCE TO RELATED APPLICATIONS

This application is a U.S. National Phase of International Patent Application No. PCT/JP2018/046050 filed on Dec. 14, 2018, which claims priority benefit of Japanese Patent Application No. JP 2018-040576 filed in the Japan Patent Office on Mar. 7, 2018. Each of the above-referenced applications is hereby incorporated herein by reference in its entirety.

TECHNICAL FIELD

The present technology relates to a drive circuit, an electronic apparatus, and a method of controlling the drive circuit. Specifically, the present technology relates to a drive circuit, an electronic apparatus, and a method of controlling the drive circuit that charges and discharges a capacitive load.

BACKGROUND ART

From the past, a capacitive load such as a piezoelectric actuator has been used to displace a member such as a lens in an imaging apparatus and a robot. As a circuit that drives this capacitive load, for example, a drive circuit that amplifies a drive signal by a non-inverting amplifier circuit, supplies the amplified drive signal to a positive-side terminal of the capacitive load, inverts the signal by an inverting amplifier circuit, and supplies the inverted signal to a negative-side terminal of the capacitive load has been proposed (see, for example, Patent Literature 1).

CITATION LIST

Patent Literature

Patent Literature 1: Japanese Patent Application Laid-open No. 2015-159724

DISCLOSURE OF INVENTION

Technical Problem

In the above-mentioned existing technology, a drive circuit is capable of, for example, supplying current to the positive-side terminal of the capacitive load by a high-level drive signal and supplying current to the negative-side terminal by a low-level drive signal. However, there is possibility that current flows to a ground terminal of a negative-side inverting amplifier circuit when a high-level drive signal is supplied, and power consumption increases accordingly. Further, there is possibility that current flows to a ground terminal of a positive-side non-inverting amplifier circuit when a low-level drive signal is supplied, and power consumption increases accordingly. As the described above, the above-mentioned drive circuit has a problem that current flows to a ground terminal during driving, power efficiency is reduced, and power consumption increases.

The present technology has been made in view of the circumstances as described above, and it is an object of the present technology to reduce power consumption in a drive circuit that drives a capacitive load.

Solution to Problem

The present technology has been made to solve the above-mentioned problems, and a first aspect thereof is a drive circuit, including: a positive-side circuit that causes current supplied from a power source to a predetermined node to flow to a positive-side terminal of the capacitive load in a first drive mode and causes current from the capacitive load to flow from the positive-side terminal to the predetermined node in a second drive mode; and a negative-side circuit that causes current from a negative-side terminal of the capacitive load to flow to the predetermined node in the first drive mode and causes current supplied from the power supply to the predetermined node to flow to the negative-side terminal in the second drive mode, and a method of controlling the drive circuit. This brings about an effect that current flows bidirectionally between a capacitive load and a predetermined node.

Further, in this first aspect, the positive-side circuit may step-down voltage of the predetermined node and supply the stepped-down voltage to the positive-side terminal in the first drive mode and boost voltage of the positive-side terminal and supply the boosted voltage to the predetermined node in the second drive mode, and the negative-side circuit may boost voltage of the negative-side terminal and supply the boosted voltage to the predetermined node in the first drive mode and step-down the voltage of the predetermined node and supply the stepped-down voltage to the negative-side terminal. This brings about an effect that the inter-terminal voltage of a capacitive load is opposite between a first drive mode and a second drive mode.

Further, in this first aspect, each of the positive-side circuit and the negative-side circuit may include a chopper circuit that boosts and steps-down voltage. This brings about an effect that the voltage is converted by a chopper circuit.

Further, in this first aspect, the chopper circuit may include a booster circuit and a step-down circuit, and the booster circuit may include an inductor whose one end is connected to one of the positive-side terminal and the negative-side terminal, a booster-side diode having an output terminal connected to the predetermined node, a first booster-side transistor that connects, where voltage is to be boosted, a different end of the inductor and an input terminal of the booster-side diode, and a second booster-side transistor whose source and drain are connected to the different end of the inductor and a ground terminal, a predetermined pulse width modulation signal being input, where voltage is to be boosted, to a gate of the second booster-side transistor. This brings about an effect that boosting is performed by a pulse width modulation method.

Further, in this first aspect, the chopper circuit may include a booster circuit and a step-down circuit, and the step-down circuit may include an inductor whose one end is connected to one of the positive-side terminal and the negative-side terminal, a step-down-side diode having an output terminal connected to a different end of the inductor, a step-down-side transistor whose source and drain are connected to the different end of the inductor and the predetermined node, a pulse width modulation signal being input, where voltage is to be stepped-down, to a gate of the step-down-side transistor. This brings about an effect that step-down is performed by a pulse width modulation method.

Further, in this first aspect, the chopper circuit may include a booster circuit and a step-down circuit, and the step-down circuit may include an inductor whose one end is connected to one of the positive-side terminal and the negative-side terminal, a first step-down-side transistor whose source and drain are connected to a different end of the inductor and the predetermined node, a first pulse width modulation signal being input, where voltage is to be stepped-down, to a gate of the first step-down-side transistor, and a second step-down-side transistor whose source and drain are connected to the different end of the inductor and a ground terminal, a second pulse width modulation signal having a phase opposite to that of the first pulse width modulation signal being input, where voltage is to be stepped-down, to a gate of the second step-down-side transistor. This brings about an effect that step-down is performed by a step-down circuit including only a transistor.

Further, in this first aspect, the chopper circuit may include a booster circuit and a step-down circuit, and the booster circuit may include an inductor whose one end is connected to one of the positive-side terminal and the negative-side terminal, a first booster-side transistor whose source and drain are connected to a different end of the inductor and a ground terminal, a first pulse width modulation signal being input, where voltage is to be boosted, to a gate of the first booster-side transistor, and a second booster-side transistor whose source and drain are connected to the different end of the inductor and the predetermined node, a second pulse width modulation signal having a phase opposite to that of the first pulse width modulation signal being input, where voltage is to be boosted, to a gate of the second booster-side transistor. This brings about an effect that boosting is performed by a booster circuit in which the number of diodes has been reduced.

Further, in this first aspect, the chopper circuit may include an inductor whose one end is connected to one of the positive-side terminal and the negative-side terminal, a first transistor whose source and drain are connected to a different end of the inductor and the predetermined node, a first pulse width modulation signal being input to the first transistor, and a second transistor whose source and drain are connected to the different end of the inductor and a ground terminal, a second pulse width modulation signal having a phase opposite to that of the first pulse width modulation signal being input to the second transistor. This brings about an effect that the voltage is converted by a chopper circuit in which the number of diodes and the number of transistors are reduced.

Further, in this first aspect, the chopper circuit further may include a positive-side capacitor whose one end is connected to the positive-side terminal, and a negative-side capacitor whose one end is connected to the negative-side terminal. This brings about an effect that the potentials of a positive-side terminal, and a negative-side terminal are stabilized.

Further, a second aspect of the present technology is an electronic apparatus, including: a capacitive load; a positive-side circuit that causes current supplied from a power source to a predetermined node to flow to a positive-side terminal of the capacitive load in a first drive mode and causes current from the capacitive load to flow from the positive-side terminal to the predetermined node in a second drive mode; and a negative-side circuit that causes current from a negative-side terminal of the capacitive load to flow to the predetermined node in the first drive mode and causes current supplied from the power supply to the predetermined node to flow to the negative-side terminal in the second drive mode. This brings about an effect that current flows bidirectionally between a capacitive load and a predetermined node and a capacitive load is driven.

Advantageous Effects of Invention

In accordance with the present technology, it is possible to achieve an excellent effect that power consumption can be reduced in a drive circuit that drives a capacitive load. It should be noted that the effect described here is not necessarily limitative and may be any effect described in the present disclosure.

BRIEF DESCRIPTION OF DRAWINGS

FIG. 8 is a diagram showing an example of an operation of the negative-side control circuit in the first embodiment of the present technology.

FIG. 15 is a diagram showing an example of an operation of the positive-side control circuit in the second embodiment of the present technology.

FIG. 16 is a diagram showing an example of an operation of the negative-side control circuit in the second embodiment of the present technology.

FIG. 20 is a diagram showing an example of an operation of a positive-side control circuit in the third embodiment of the present technology.

FIG. 21 is a diagram showing an example of an operation the negative-side control circuit in the third embodiment of the present technology.

FIG. 24 is a diagram showing an example of an operation of the positive-side control circuit in the fourth embodiment of the present technology.

FIG. 25 is a diagram showing an example of an operation of the negative-side control circuit in the fourth embodiment of the present technology.

MODE(S) FOR CARRYING OUT THE INVENTION

Hereinafter, embodiments for carrying out the present technology (hereinafter, referred to as embodiments) will be described. Description will be made in the following order.
1. First embodiment (example in which current is caused to flow bidirectionally on positive side and negative side)
2. Second embodiment (example in which only a transistor is disposed in a step-down circuit and current is caused to flow bidirectionally on positive side and negative side)
3. Third embodiment (example in which the number of diodes is reduced and current is caused to flow bidirectionally on positive side and negative side)
4. Fourth embodiment (example in which the number of diodes and the number of transistors are reduced and current is caused to flow bidirectionally on positive side and negative side)
5. Application example 1. First Embodiment

[Configuration Example of Electronic Apparatus]

Figure 1:
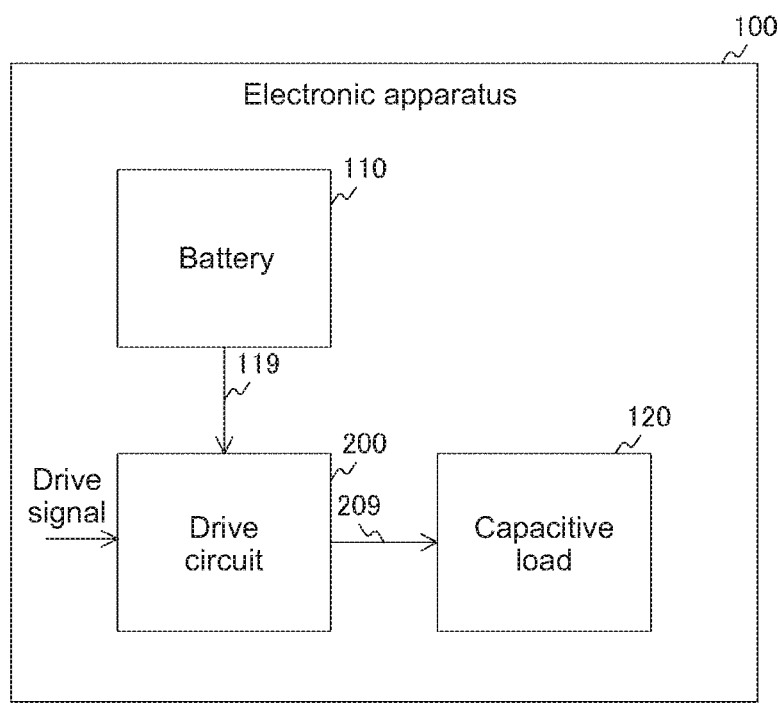
FIG. 1 is a block diagram showing a configuration example of an electronic apparatus according to a first embodiment of the present technology.

FIG. 1 is a block diagram showing a configuration example of an electronic apparatus 100 according to a first embodiment of the present technology. This electronic apparatus 100 includes a battery 110, a drive circuit 200, and a capacitive load 120. As the electronic apparatus 100, for example, an imaging apparatus, a smartphone, or a robot is assumed.

The battery 110 generates DC power and supplies the generated DC power to the drive circuit 200 via a signal line 119. The drive circuit 200 supplies, in accordance with a drive signal, electric energy to the capacitive load 120 via a signal line 209 to drive the capacitive load 120. The capacitive load 120 includes, for example, a piezoelectric actuator. The piezoelectric actuator deforms when electric energy is supplied, and displaces a member such as a lens. Note that the capacitive load 120 may include a device and a circuit other than a piezoelectric actuator.

[Configuration Example of Drive Circuit]

Figure 2:
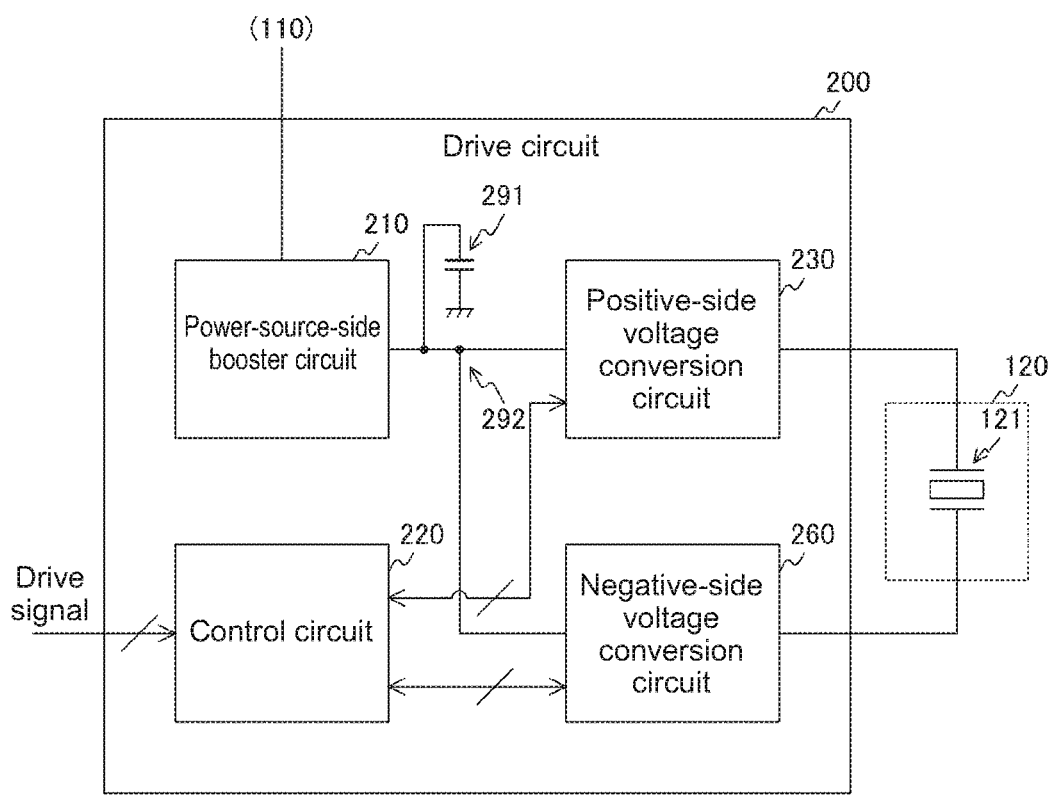
FIG. 2 is a block diagram showing a configuration example of the drive circuit according to the first embodiment of the present technology.

FIG. 2 is a block diagram showing a configuration example of the drive circuit 200 according to the first embodiment of the present technology. This drive circuit 200 includes a power-source-side booster circuit 210, a control circuit 220, a positive-side voltage conversion circuit 230, a negative-side voltage conversion circuit 260, and a capacitor 291. Further, the capacitive load 120 includes a piezoelectric actuator 121.

The power-source-side booster circuit 210 boosts the power source voltage from the battery 110 and supplies the boosted power source voltage to the positive-side voltage conversion circuit 230 and the negative-side voltage conversion circuit 260 via a node 292.

The positive-side voltage conversion circuit 230 converts the voltage, and causes current to flow in different directions in a first drive mode and a second drive mode. Here, the first drive mode is a mode in which charges are transmitted to a positive-side terminal of the piezoelectric actuator 121 and charges are taken out from a negative-side terminal, and the second drive mode is a mode in which charges are taken out from the positive-side terminal of the piezoelectric actuator 121 and charges are transmitted to the negative-side terminal. These modes are designated by a drive signal.

The positive-side voltage conversion circuit 230 causes current supplied to the node 292 by the power-source-side booster circuit 210 to flow to the positive-side terminal of the piezoelectric actuator 121 in the first drive mode. Meanwhile, the positive-side voltage conversion circuit 230 causes current from the piezoelectric actuator 121 to flow from the positive-side terminal of piezoelectric actuator 121 to the node 292 in the second drive mode.

Further, the positive-side voltage conversion circuit 230 steps-down the voltage of the node 292 by using a pulse width modulation (PWM) signal and supplies the stepped-down voltage to the positive-side terminal of the piezoelectric actuator 121 in the first drive mode. The PWM signal is a periodic signal of a predetermined frequency, which is used in a pulse width modulation method. For example, a rectangular wave periodic signal is used as a PWM signal, and the value of the voltage to be converted is controlled by the pulse width. Meanwhile, in the second drive mode, the positive-side voltage conversion circuit 230 boosts the voltage of the positive-side terminal by using a PWM signal and supplies the boosted voltage to the node 292. Note that the positive-side voltage conversion circuit 230 is an example of a positive-side circuit described in the claims.

The negative-side voltage conversion circuit 260 converts voltage, and causes current in different directions in the first drive mode and the second drive mode. This negative-side voltage conversion circuit 260 causes current to flow from a negative-side terminal of the piezoelectric actuator 121 to the node 292 in the first drive mode. Meanwhile, the negative-side voltage conversion circuit 260 causes current to flow from the node 292 to the negative-side terminal of the piezoelectric actuator 121.

Further, the negative-side voltage conversion circuit 260 boosts the voltage of the negative-side terminal of the piezoelectric actuator 121 by using a PWM signal and supplies the boosted voltage to the node 292 in the first drive mode. Meanwhile, the negative-side voltage conversion circuit 260 steps-down the voltage of the node 292 by using a PWM signal and supplies the stepped-down voltage to the negative-side terminal of the piezoelectric actuator 121 in the second drive mode. Note that the negative-side voltage conversion circuit 260 is an example of a negative-side circuit described in the claims.

The control circuit 220 controls, in accordance with a drive signal, the positive-side voltage conversion circuit 230 and the negative-side voltage conversion circuit 260 by a pulse width modulation method.

The capacitor 291 is connected to the node 292, and is used for mitigating the potential fluctuation of the node 292. Note that the capacitor 291 is disposed in the drive circuit 200, but may be disposed outside the drive circuit 200. Further, the capacitor 291 is disposed outside the positive-side voltage conversion circuit 230 and the negative-side voltage conversion circuit 260, but may be divided and disposed inside thereof.

Figure 3A:
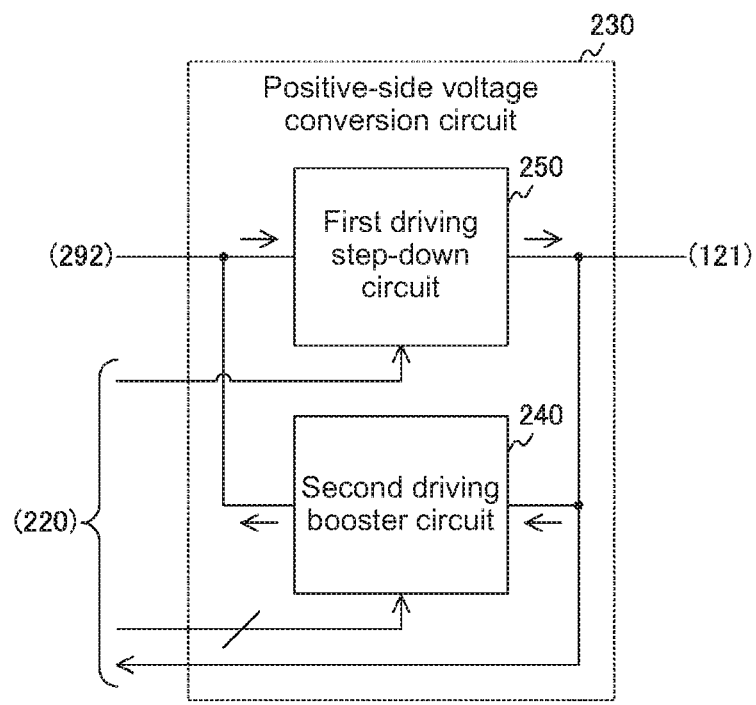
FIGS. 3A and 3B are block diagrams showing a configuration example of a positive-side voltage conversion circuit and a negative-side voltage conversion circuit in the first embodiment of the present technology.
Figure 3B:
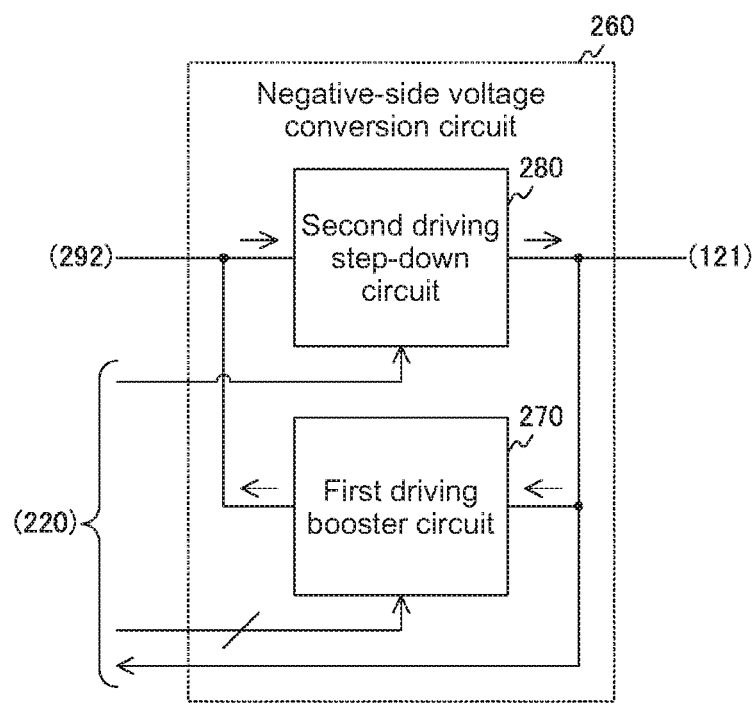

FIGS. 3A and 3B are block diagrams showing a configuration example of the positive-side voltage conversion circuit 230 and the negative-side voltage conversion circuit 260 in the first embodiment of the present technology. FIG. 3A is a block diagram showing a configuration example of the positive-side voltage conversion circuit 230, and FIG. 3B is a block diagram showing a configuration example of the negative-side voltage conversion circuit 260. Arrows in FIGS. 3A and 3B each indicate the orientation of current.

The positive-side voltage conversion circuit 230 includes a first driving step-down circuit 250 and a second driving booster circuit 240. The first driving step-down circuit 250 steps-down the voltage of the node 292 in the first drive mode. The second driving booster circuit 240 boosts the voltage of the positive-side terminal of the piezoelectric actuator 121 in the second drive mode and supplies the boosted voltage to the node 292.

The negative-side voltage conversion circuit 260 includes a second driving step-down circuit 280 and a first driving booster circuit 270. The second driving step-down circuit 280 steps-down the voltage of the node 292 and supplies the stepped-down voltage to the negative-side terminal of the piezoelectric actuator 121 in the second drive mode. The first driving booster circuit 270 boosts the voltage of the negative-side terminal of the piezoelectric actuator 121 and supplies the boosted voltage to the node 292 in the first drive mode.

[Configuration Example of Positive-Side Voltage Conversion Circuit]

Figure 4:
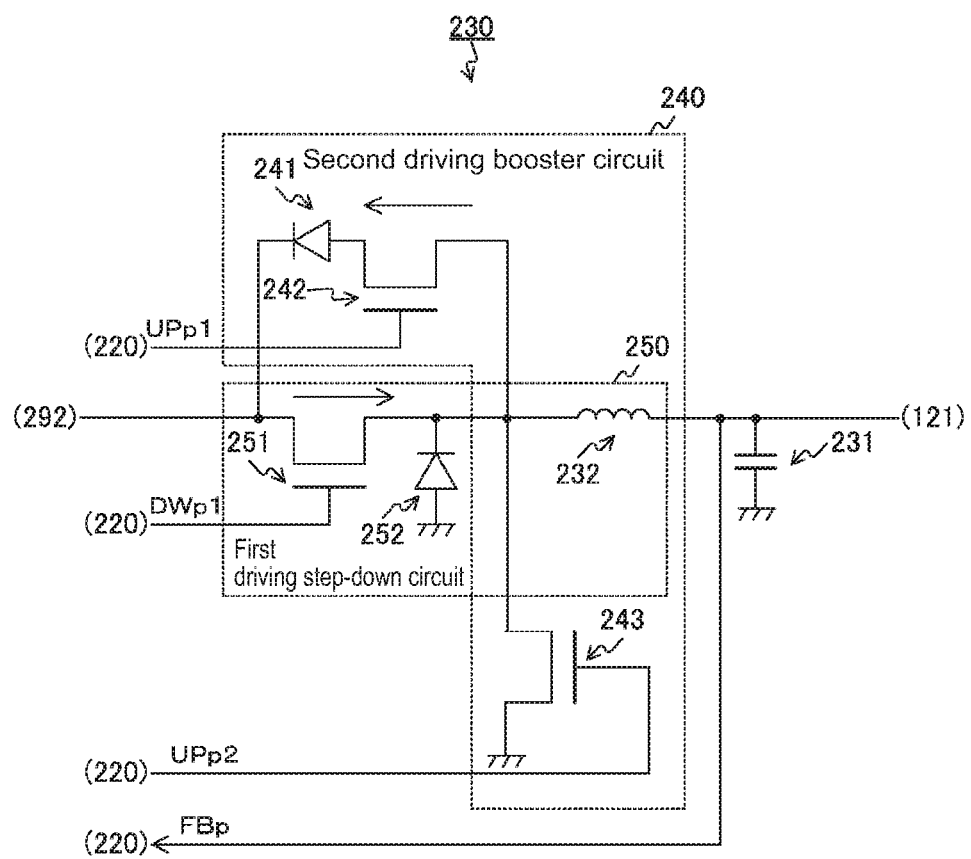
FIG. 4 is a circuit diagram showing a configuration example of the positive-side voltage conversion circuit in the first embodiment of the present technology.

FIG. 4 is a circuit diagram showing a configuration example of the positive-side voltage conversion circuit 230 in the first embodiment of the present technology. This positive-side voltage conversion circuit 230 include a capacitor 231, an inductor 232, a booster-side diode 241, booster-side transistors 242 and 243, a step-down-side transistor 251, and a step-down-side diode 252. As the booster-side transistor 242, the booster-side transistor 243, and the step-down-side transistor 251, for example, nMOS (n-channel Metal Oxide Semiconductor) transistors are used. Further, the voltage of the positive-side terminal of the piezoelectric actuator 121 is fed back to the control circuit 220 as a feedback signal FBp.

One end of the capacitor 231 is connected to the positive-side terminal of the piezoelectric actuator 121, and the other end is connected to a ground terminal. By disposing the capacitor 231, it is possible to mitigate the potential fluctuation of the positive-side terminal. For a stable operation, for example, the capacitor 231 needs to have a capacitance value of approximately ⅕ of the capacitance component of the piezoelectric actuator 121. Further, by connecting a capacitor also to the negative-side terminal, the independence of the positive-side terminal and the negative-side terminal can be maintained. Note that the capacitor 231 is an example of a positive-side capacitor described in the claims. Further, in the case where it is not necessary to stabilize the operation, the capacitor 231 does not necessarily need to be disposed.

One end of the inductor 232 is connected to the positive-side terminal of the piezoelectric actuator 121, and the other end is connected to the booster-side transistors 242 and 243, the step-down-side transistor 251, and an output terminal of the step-down-side diode 252.

The output terminal of the booster-side diode 241 is connected to the node 292, and the input terminal of the booster-side diode 241 is connected to the booster-side transistor 242. The source and drain of the booster-side transistor 242 are connected to the booster-side diode 241 and one end of the inductor 232, and a control signal UPp1 from the control circuit 220 is input to the gate of the booster-side transistor 242. The source and drain of the booster-side transistor 243 are connected to an end of the inductor 232 and a ground terminal, and a control signal UPp2 from the control circuit 220 is input to the gate of the booster-side transistor 243. Note that the booster-side transistor 242 is an example of a first booster-side transistor described in the claims, and the booster-side transistor 243 is an example of a second booster-side transistor described in the claims.

The control circuit 220 connects the booster-side diode 241 to one end of the inductor 232 by the control signal UPp1 and inputs a PWM signal as the control signal UPp2 in the second drive mode. As a result, it is possible to boost the voltage of the positive-side terminal of the piezoelectric actuator 121 to a value corresponding to the pulse width of the PWM signal. That is, a circuit including the inductor 232, the booster-side diode 241, and the booster-side transistors 242 and 243 functions as the second driving booster circuit 240.

The source and drain of the step-down-side transistor 251 are connected to the node 292 and one end of the inductor 232, and a control signal DWp1 from the control circuit 220 is input to the gate of the step-down-side transistor 251. Further, the output terminal of the step-down-side diode 252 is connected to one end of the inductor 232, and the other end is connected to a ground terminal.

The control circuit 220 inputs a PWM signal as the control signal DWp1 in the first drive mode. This makes it possible to step-down the voltage of the node 292 to the value corresponding to the pulse width of the PWM signal. That is, a circuit including the inductor 232, the step-down-side transistor 251, and the step-down-side diode 252 functions as the first driving step-down circuit 250.

A circuit that steps-down or boosts voltage by a pulse width modulation method using an inductor and a transistor that operates by a PWM signal is referred to as the chopper circuit. Note that a circuit including the second driving booster circuit 240, the first driving step-down circuit 250, and the capacitor 231 is an example of a chopper circuit described in the claims. Further, the second driving booster circuit 240 is an example of a booster circuit described in the claims, and the first driving step-down circuit 250 is an example of a step-down circuit described in the claims.

[Configuration Example of Negative-Side Voltage Conversion Circuit]

Figure 5:
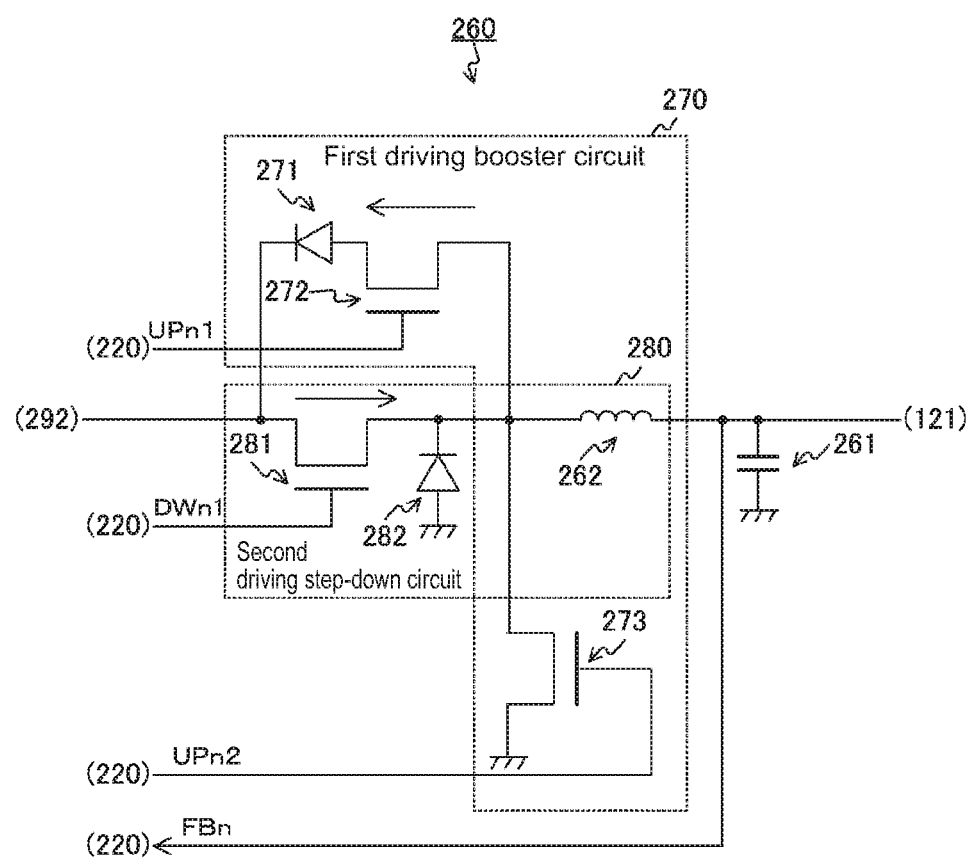
FIG. 5 is a circuit diagram showing a configuration example of the negative-side voltage conversion circuit in the first embodiment of the present technology.

FIG. 5 is a circuit diagram showing a configuration example of the negative-side voltage conversion circuit 260 in the first embodiment of the present technology. This negative-side voltage conversion circuit 260 includes a capacitor 261, an inductor 262, a booster-side diode 271, booster-side transistors 272 and 273, a step-down-side transistor 281, and a step-down-side diode 282. As the booster-side transistor 272, the booster-side transistor 273, and the step-down-side transistor 281, for example, nMOS transistors are used. The connection configuration of the devices in the negative-side voltage conversion circuit 260 is similar to that of the positive-side voltage conversion circuit 230. Further, the voltage of the negative-side terminal of the piezoelectric actuator 121 is fed back to the control circuit 220 as a feedback signal FBn.

Note that the capacitor 261 is an example of a negative-side capacitor described in the claims. Further, in the case where it is not necessary to stabilize the operation, the capacitor 261 does not necessarily need to be disposed.

A control signal UPn1 from the control circuit 220 is input to the gate of the booster-side transistor 272, and a control signal UPn2 from the control circuit 220 is input to the gate of the booster-side transistor 273. Further, a control signal DWn1 from the control circuit 220 is input to the gate of the step-down-side transistor 281. Note that the booster-side transistor 272 is an example of a first booster-side transistor described in the claims, and the booster-side transistor 273 is an example of a second booster-side transistor described in the claims.

Further, the control circuit 220 connects the booster-side diode 271 to one end of the inductor 262 by the control signal UPn1 and inputs a PWM signal as the control signal UPn2 in the first drive mode. This makes it possible to boost the voltage of the negative-side terminal of the piezoelectric actuator 121. That is, a circuit including the inductor 262, the booster-side diode 271, and the booster-side transistors 272 and 273 functions as the first driving booster circuit 270.

The control circuit 220 inputs a PWM signal as the control signal DWn1 in the second drive mode. This makes it possible to step-down the voltage of the node 292. That is, a circuit including the inductor 262, the step-down-side transistor 281, and the step-down-side diode 282 functions as the second driving step-down circuit 280.

Note that a circuit including the first driving booster circuit 270, the second driving step-down circuit 280, and the capacitor 261 is an example of a chopper circuit described in the claims. Further, the first driving booster circuit 270 is an example of a booster circuit described in the claims, and the second driving step-down circuit 280 is an example of a step-down circuit described in the claims.

[Configuration Example of Control Circuit]

Figures 6, 7:
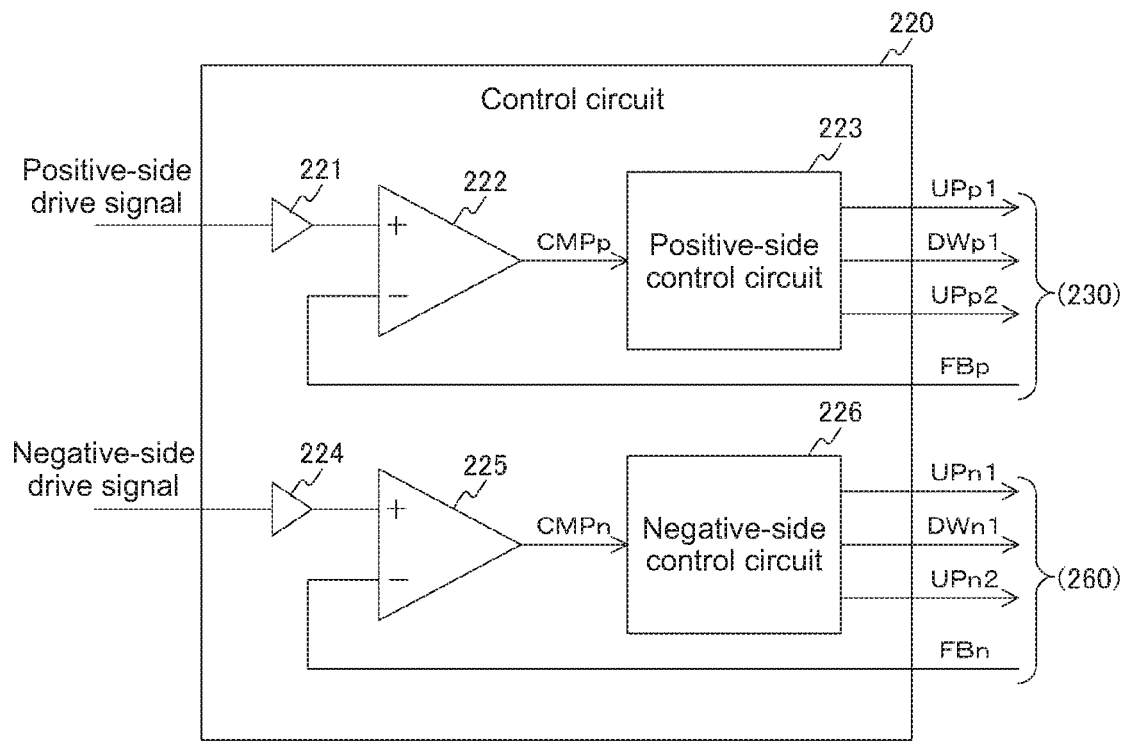
FIG. 6 is a block diagram showing a configuration example of a control circuit according to the first embodiment of the present technology.
FIG. 7 is a diagram showing an example of an operation of the positive-side control circuit in the first embodiment of the present technology.

FIG. 6 is a block diagram showing a configuration example of the control circuit 220 in the first embodiment of the present technology. This control circuit 220 includes amplifiers 221 and 224, comparators 222 and 225, a positive-side control circuit 223, and a negative-side control circuit 226.

Further, a drive signal is input to the control circuit 220. This drive signal is a signal for designating either the first drive mode or the second drive mode. For example, the drive signal is generated by an operation circuit in accordance with a user operation. Alternatively, the drive signal is generated by a CPU (Central Processing Unit) or the like by executing a predetermined application for driving the piezoelectric actuator 121. As the drive signal, a differential signal is used. This differential drive signal includes a positive-side drive signal and a negative-side drive signal having a phase opposite to that of the positive-side drive signal. The positive-side drive signal is input to the amplifier 221, and the negative-side drive signal is input to an amplifier 224.

The amplifier 221 amplifies the positive-side drive signal. This amplifier 221 supplies the amplified signal to a non-inverting input terminal (+) of the comparator 222. The amplifier 224 amplifies the negative-side drive signal. This amplifier 224 supplies the amplified signal to a non-inverting input terminal (+) of the comparator 225.

The comparator 222 compares the feedback signal FBp and the amplified positive-side drive signal with each other. This comparator 222 supplies a comparison result CMPp to the positive-side control circuit 223. The comparator 225 compares the feedback signal FBn and the amplified negative-side drive signal with each other. This comparator 225 supplies a comparison result CMPn to the negative-side control circuit 226.

The positive-side control circuit 223 controls the positive-side voltage conversion circuit 230 by the control signals UPp1, DWp1, and UPp2 on the basis of the comparison result CMPp. The negative-side control circuit 226 controls the negative-side voltage conversion circuit 260 by the control signals UPn1, DWn1, and UPn2 on the basis of the comparison result CMPn.

FIG. 7 is a diagram showing an example of an operation of the positive-side control circuit 223 in the first embodiment of the present technology. The comparison result CMPp becomes low level in the second drive mode and becomes high level in the first drive mode, for example.

In the case where the comparison result CMPp is at the low level (i.e., in the second drive mode), the positive-side control circuit 223 outputs the high-level control signal UPp1 and the low-level control signal DWp1, and outputs a PWM signal as the control signal UPp2. By these control signals, boosting is performed in the positive-side voltage conversion circuit 230.

Meanwhile, in the case where the comparison result CMPp is at the high level (i.e., in the first drive mode), the positive-side control circuit 223 outputs the low-level control signals UPp1 and UPp2 and outputs a PWM signal as the control signal DWp1. By these control signals, step-down is performed in the positive-side voltage conversion circuit 230.

FIG. 8 is a diagram showing an example of an operation of the negative-side control circuit 226 in the first embodiment of the present technology. The comparison result CMPn becomes high level in the second drive mode and becomes low level in the first drive mode, for example.

In the case where the comparison result CMPn is at the low level (i.e., in the first drive mode), the negative-side control circuit 226 outputs the high-level control signal UPn1 and the low-level control signal DWn1 and outputs a PWM signal as the control signal UPn2. By these control signals, boosting is performed in the negative-side voltage conversion circuit 260.

Meanwhile, in the case where the comparison result CMPn is at the high level (i.e., in the second drive mode), the negative-side control circuit 226 outputs the low-level control signals UPn1 and UPn2 and outputs a PWM signal as the control signal DWn1. By these control signals, step-down is performed in the negative-side voltage conversion circuit 260.

Figure 9A:
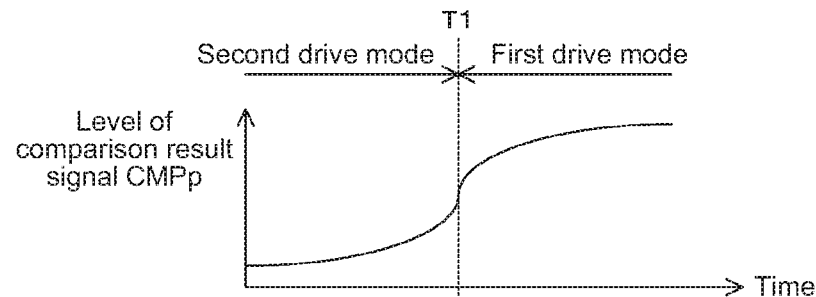
FIGS. 9A, 9B, 9C, and 9D are diagrams showing an example of a drive signal and terminal voltage fluctuations in the first embodiment of the present technology.
Figure 9B:
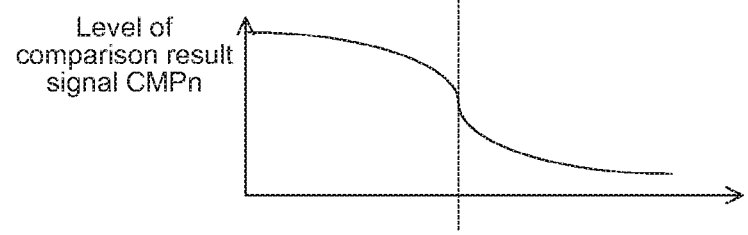
Figure 9C:
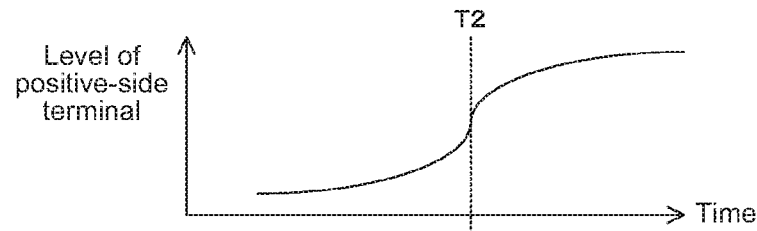
Figure 9D:
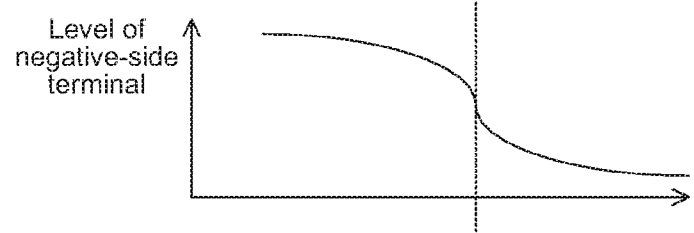

FIGS. 9A, 9B, 9C, and 9D are diagrams showing an example of a drive signal and terminal voltage fluctuations in the first embodiment of the present technology. In FIGS. 9A, 9B, 9C, and 9D, the vertical axis indicates a signal or terminal voltage, and the horizontal axis indicates time. FIG. 9A is a diagram showing an example of fluctuations in the comparison result signal CMPp, and FIG. 9B is a diagram showing an example of fluctuations in the comparison result signal CMPn. FIG. 9C is a diagram showing an example of voltage fluctuations of the positive-side terminal of the piezoelectric actuator 121, and FIG. 9D is a diagram showing an example of voltage fluctuations of the negative-side terminal of the piezoelectric actuator 121.

For example, in the period up to a predetermined timing T1, the comparison result signal CMPp is at a low level equal to or lower than a predetermined voltage and the comparison result signal CMPn is at a high level higher than the predetermined voltage. In this period, the electronic apparatus 100 shifts to the second drive mode. Then, in the period after the timing T1, the comparison result signal CMPp is at a high level higher than the predetermined voltage and the comparison result signal CMPn is at a low level equal to or lower than the predetermined voltage. In this period, the electronic apparatus 100 shifts to the first drive mode.

In the period after the timing T up to a timing T2, charges are supplied to the negative-side terminal of the piezoelectric actuator 121 and charges are taken out from the positive-side terminal of the piezoelectric actuator 121. Meanwhile, in the period after the timing T2, charges are supplied to the positive-side terminal of the piezoelectric actuator 121 and charges are taken out from the negative-side terminal of the piezoelectric actuator 121.

Figure 10:
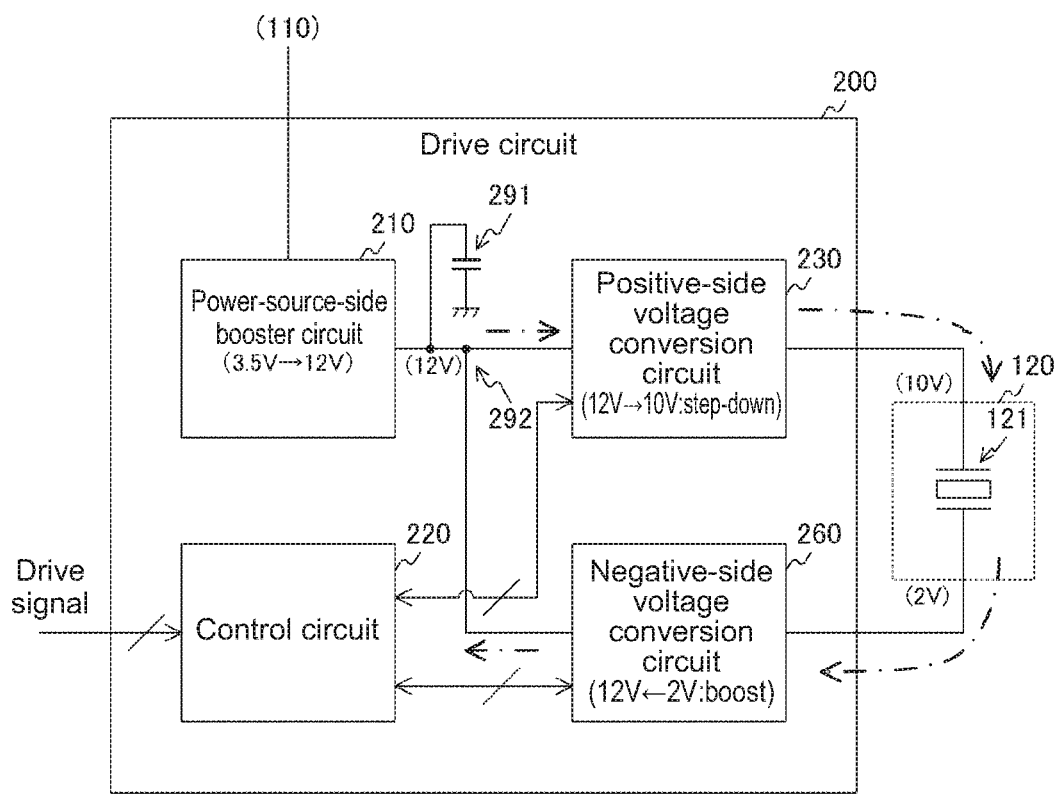
FIG. 10 is a diagram showing an example of the state of the electronic apparatus in a first drive mode in the first embodiment of the present technology.

FIG. 10 is a diagram showing an example of the state of the electronic apparatus 100 in the first drive mode in the first embodiment of the present technology. The battery 110 supplies a DC voltage of 3.5 volts (V), for example. Then, the power-source-side booster circuit 210 boosts the DC voltage to 12 volts (V) and supplies current corresponding to the voltage via the node 292. The dot-dash line in FIG. 10 indicates the path through which current flows, and the arrow of the dot-dash line indicates the direction in which current flows.

In the case where the first drive mode is designated by a drive signal, the positive-side voltage conversion circuit 230 causes, in accordance with control of the control circuit 220, current to flow from the node 292 to the positive-side terminal of the piezoelectric actuator 121. At this time, the positive-side voltage conversion circuit 230 steps-down the voltage of the node 292 to, for example, 10 volts (V) and supplies the stepped-down voltage to the positive-side terminal. Meanwhile, the negative-side voltage conversion circuit 260 causes, in accordance with control of the control circuit 220, current to flow from the negative-side terminal of the piezoelectric actuator 121 to the node 292. At this time, the negative-side voltage conversion circuit 260 boosts the voltage of the negative-side terminal from, for example, 2 volts (V) to 12 volts (V) and supplies the boosted voltage to the node 292.

As described above, part of the electric power supplied from the node 292 to the positive-side terminal of the piezoelectric actuator 121 by the positive-side voltage conversion circuit 230 is transferred and returned to the node 292 by the negative-side voltage conversion circuit 260. Therefore, it is possible to reduce the electric power to be supplied by the battery 110 (i.e., power consumption of the electronic apparatus 100) by the amount of the returned electric power.

Figure 11:
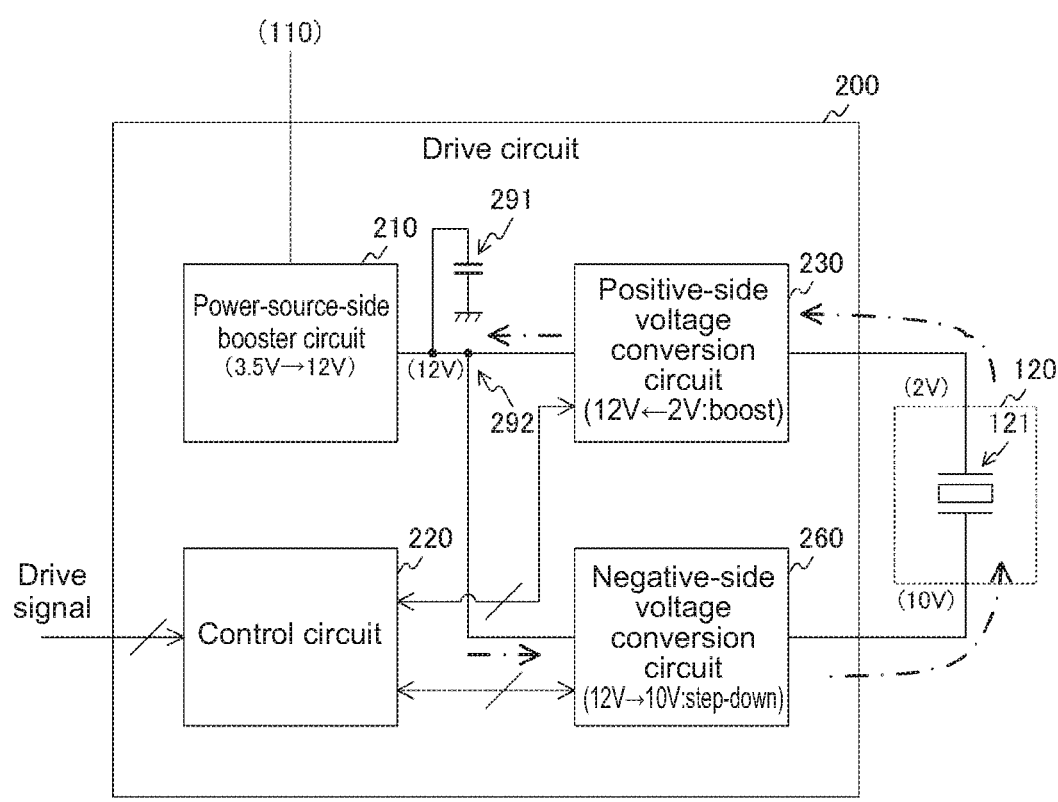
FIG. 11 is a diagram showing an example of the state of the electronic apparatus in a second drive mode in the first embodiment of the present technology.

FIG. 11 is a diagram showing an example of the state of the electronic apparatus 100 in the second drive mode in the first embodiment of the present technology. The dot-dash line in FIG. 11 indicates the path through which current flows and the arrow of the dot-dash line indicates the direction in which current flows.

In the case where the second drive mode is designated by a drive signal, the positive-side voltage conversion circuit 230 causes, in accordance with control of the control circuit 220, current to flow from the positive-side terminal of the piezoelectric actuator 121 to the node 292. At this time, the positive-side voltage conversion circuit 230 boosts the voltage of the positive-side terminal from, for example, 2 volts (V) to 12 volts (V) and supplies the boosted voltage to the node 292. Meanwhile, the negative-side voltage conversion circuit 260 causes, in accordance with control of the control circuit 220, current to flow from the node 292 to the negative-side terminal of the piezoelectric actuator 121. At this time, the negative-side voltage conversion circuit 260 steps-down the voltage of the node 292 to, for example, 10 volts (V) and supplies the stepped-down voltage to the negative-side terminal.

As described above, part of the electric power supplied from the node 292 to the negative-side terminal of the piezoelectric actuator 121 by the negative-side voltage conversion circuit 260 is transferred and returned to the node 292 by the positive-side voltage conversion circuit 230. Therefore, it is possible to reduce the power consumption of the electronic apparatus 100 by the amount of the returned electric power.

Here, assumption is made that the capacitance of the piezoelectric actuator 121 is C and the voltage between the positive-side terminal and the negative-side terminal is Va. Further, assumption is made that the voltage conversion efficiency of the power-source-side booster circuit 210 is Rd and the power transfer efficiency via the positive-side voltage conversion circuit 230, the piezoelectric actuator 121, and the negative-side voltage conversion circuit 260 is Ra. In this case, the electric power generated during the power transfer in the positive-side voltage conversion circuit 230, and the negative-side voltage conversion circuit 260 in the first drive mode is represented by the following formula.

$$P0=(C \cdot Va^2/2) \times \{(100-Ra)/100\} \times (100/Rd) = (C \cdot Va^2/2) \times (100-Ra)/Rd \quad \text{Formula 1}$$

The power loss in the second drive mode is similar to that in the first drive mode. Therefore, the power loss generated in the second drive mode and in the first drive mode is 2×P0.

For comparison, a Comparative Example in which an amplifier circuit is disposed instead of the positive-side voltage conversion circuit 230 and the negative-side voltage conversion circuit 260 is assumed. In this case, the current from the negative-side terminal flows to the negative-side ground terminal of the amplifier circuit and the electric power increases in the first drive mode. Similarly, the current from the positive-side terminal flows to positive-ide ground terminal of the amplifier circuit and the electric power increase in the second drive mode.

In the Comparative Example, the electric power generated in the first drive mode is divided into the amount used for charging the piezoelectric actuator 121 and the amount of loss generated in the amplifier circuit. When the former is represented by P1 and the latter is represented by P2, power losses P1 and P2 are represented by the following formulae.

$$P1=(C \cdot Va^2/2) \times (100/Rd) \quad \text{Formula 2}$$

$$P2=(C \cdot Va^2/2) \times (Rc/100) \times (100/Rd) = (C \cdot Va^2/2) \times (Rc/Rd) \quad \text{Formula 3}$$

In the above-mentioned formula, Rc represents the power loss of the amplifier circuit during the first drive.

Meanwhile, the power loss in the second drive mode is similar to that in the first drive mode. Therefore, the power loss generated in the second drive mode and in the first drive mode is 2×(P1+P2).

In the Comparative Example, the total power generated in the second drive mode and in the first drive mode is represented by the following formula on the basis of the formula 2 or formula 3.

$$Ploss'=2\times(P1+P2)=2\times(C\cdot Va^2/2)\times(100+Rc)/Rd \quad \text{Formula 4}$$

Assumption is made that a voltage conversion efficiency Rd of the power-source-side booster circuit 210 and a power transfer efficiency Ra via the positive-side voltage conversion circuit 230, the piezoelectric actuator 121, and the negative-side voltage conversion circuit 260 are each 80 percent (%). In this case, the electric power of the electronic apparatus 100 that performs control of returning the electric power is represented by the following formula on the basis of the formula 1.

$$Ploss=(C\cdot Va^2/2)\times 0.5 \quad \text{Formula 5}$$

Meanwhile, when assumption is made that a power loss rate Rc of the amplifier circuit is 10 percent (%), the electric power in the Comparative Example is represented by the following formula on the basis of the formula 4.

$$Ploss'=(C\cdot Va^2/2)\times 2.75 \quad \text{Formula 6}$$

As shown in the formula 5 and formula 6, the electric power is much smaller than that in the Comparative Example by the control of returning the electric power and it is possible to reduce the power loss by approximately 80 percent (%) with respect to the Comparative Example. Further, when assumption is made that the voltage conversion efficiency Rd and the power transfer efficiency Ra are each 70 percent (%), it is possible to reduce the power loss by approximately 70 percent (%). When assumption is made that the voltage conversion efficiency Rd and the power transfer efficiency Ra are respectively 60 percent (%) and 70 percent (%), it is possible to reduce the power loss by approximately 60 percent (%). Therefore, it is possible to significantly reduce power consumption. Further, it is possible to make the output capacity of the power-source-side booster circuit 210 smaller than that in the Comparative Example and realize the power-source-side booster circuit 210 with small circuit parts.

[Example of Operation of Electronic Apparatus]

Figure 12:
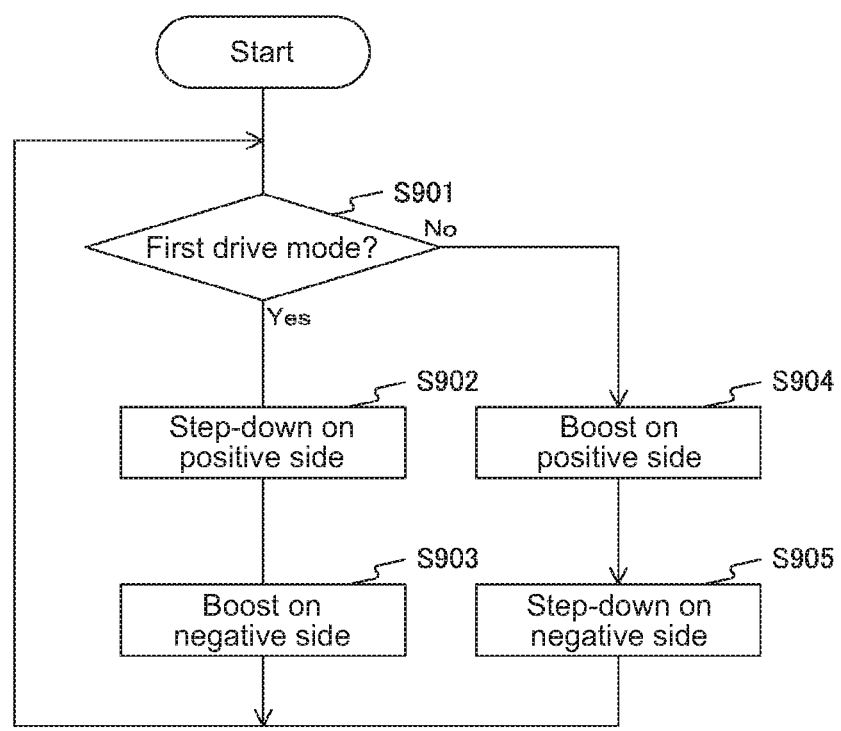
FIG. 12 is a flowchart showing an example of an operation of the electronic apparatus according to the first embodiment of the present technology.

FIG. 12 is a flowchart showing an example of an operation of the electronic apparatus 100 according to the first embodiment of the present technology. This operation is started in the case where an application for displacing a lens or the like is executed, for example.

The control circuit 220 determines whether or not the first drive mode is designated by a drive signal (Step S901). In the case where the first drive mode is designated (Step S901: Yes), the control circuit 220 controls the positive-side voltage conversion circuit 230 to perform step-down (Step S902) and controls the negative-side voltage conversion circuit 260 to perform boosting (Step S903).

Meanwhile, in the case where the second drive mode is designated (Step S901: No), the control circuit 220 controls the positive-side voltage conversion circuit 230 to perform boosting (Step S904) and controls the negative-side voltage conversion circuit 260 to perform step-down (Step S905). After Step S903 or S905, the control circuit 220 repeatedly executes Step S901 and subsequent Steps.

As described above, in accordance with the first embodiment of the present technology, since the positive-side voltage conversion circuit 230 and the negative-side voltage conversion circuit 260 cause current to flow in both directions, it is possible to return part of the electric power supplied from the battery 110 or the like to the supply source. As a result, it is possible to reduce the power loss and reduce power consumption.

2. Second Embodiment

In the above-mentioned first embodiment, the step-down-side transistor 251 (nMOS transistor) and the step-down-side diode 252 have been used in the first driving step-down circuit 250. However, it is easier to produce the first driving step-down circuit 250 configured by transistors having the same polarity rather than the first driving step-down circuit 250 including a transistor and a diode, and reduce the production cost. The first driving step-down circuit 250 in the second embodiment is different from that in the first embodiment in that only nMOS transistors are disposed.

Figure 13:
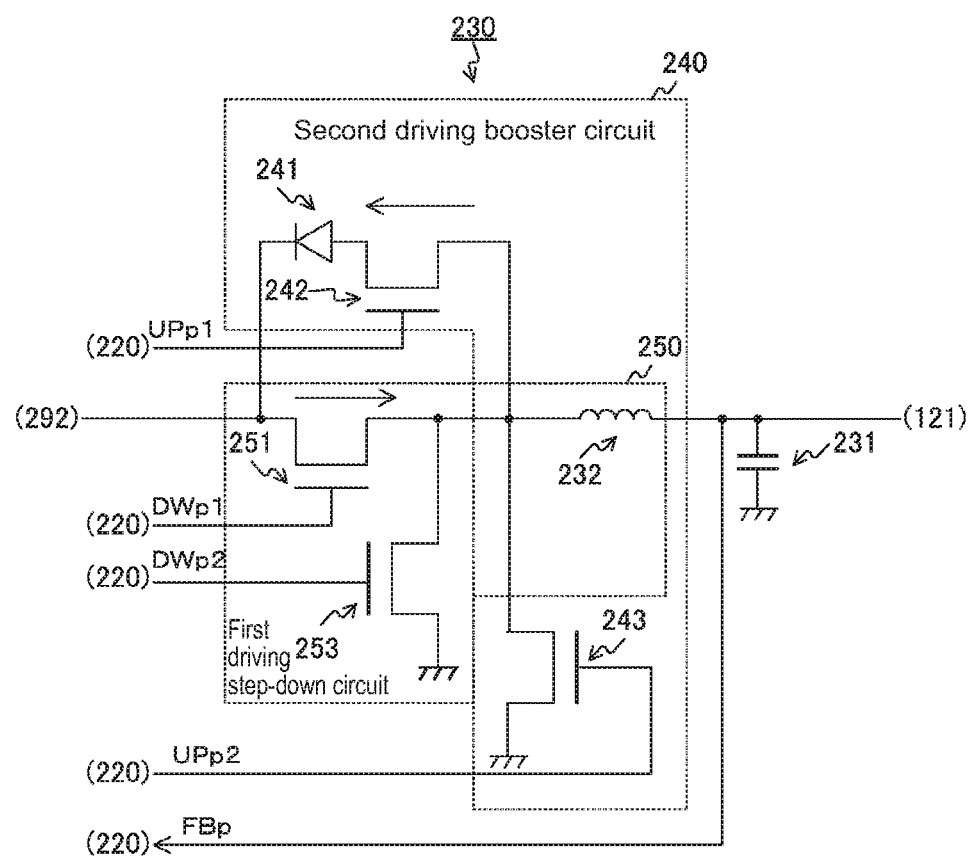
FIG. 13 is a circuit diagram showing a configuration example of a positive-side voltage conversion circuit in a second embodiment of the present technology.

FIG. 13 is a circuit diagram showing a configuration example of the positive-side voltage conversion circuit 230 in the second embodiment of the present technology. This positive-side voltage conversion circuit 230 in the second embodiment is different from that in the first embodiment in that a step-down-side transistor 253 is disposed instead of the step-down-side diode 252. As the step-down-side transistor 253, for example, an nMOS transistor is used.

The source and drain of the step-down-side transistor 253 are connected to one end of the inductor 232 and a ground terminal, and a control signal DWp2 from the control circuit 220 is input to the gate of the step-down-side transistor 253. Note that the step-down-side transistor 251 is an example of a first step-down-side transistor described in the claims, and the step-down-side transistor 253 is an example of a second step-down-side transistor described in the claims.

Figure 14:
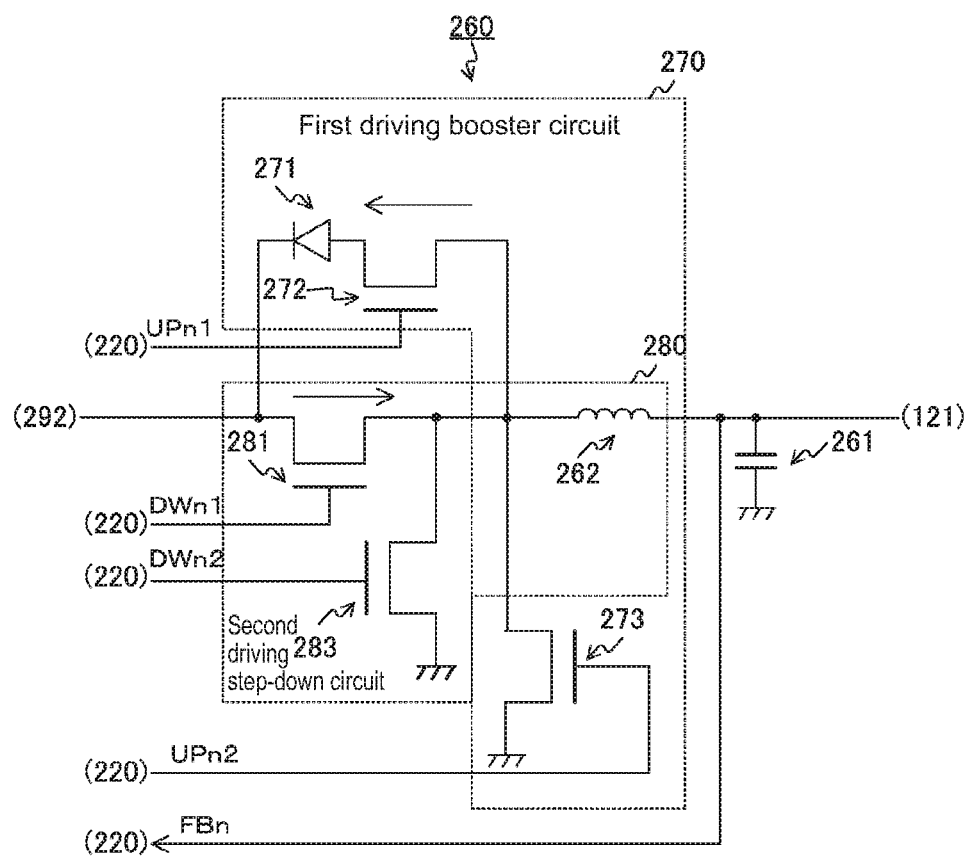
FIG. 14 is a circuit diagram showing a configuration example of a negative-side voltage conversion circuit in the second embodiment of the present technology.

FIG. 14 is a circuit diagram showing a configuration example of the negative-side voltage conversion circuit 260 in the second embodiment of the present technology. This negative-side voltage conversion circuit 260 in the second embodiment is different from that in the first embodiment in that a step-down-side transistor 283 is disposed instead of the step-down-side diode 282. The connection configuration of the step-down-side transistor 283 is similar to that of the positive-side voltage conversion circuit 230. Note that the step-down-side transistor 281 is an example of a first step-down-side transistor described in the claims, and the step-down-side transistor 283 is an example of a second step-down-side transistor described in the claims.

FIG. 15 is a diagram showing an example of an operation of the positive-side control circuit 223 in the second embodiment of the present technology.

In the case where the comparison result CMPp is at a low level (i.e., in the second drive mode), the positive-side control circuit 223 outputs the high-level control signal UPp1 and the low-level control signals DWp1 and DWp2, and outputs a PWM signal as the control signal UPp2. By these control signals, boosting is performed.

Meanwhile, in the case where the comparison result CMPp is at a high level (i.e., in the first drive mode), the positive-side control circuit 223 outputs the low-level control signals UPp1 and UPp2. Further, the positive-side control circuit 223 outputs a PWMa signal as the control signal DWp1 and outputs a PWMb signal as the control signal DWp2. The PWMa signal and the PWMb signal are PWM signals having phases opposite to each other. By these control signals, step-down is performed.

FIG. 16 is a diagram showing an example of an operation of the negative-side control circuit 226 in the second embodiment of the present technology.

In the case where the comparison result CMPn is at a low level (i.e., in the first drive mode), the negative-side control circuit 226 outputs the high-level control signal UPn1 and the low-level control signals DWn1 and DWn2, and outputs the PWM signal as the control signal UPn2. By these control signals, boosting is performed in the negative-side voltage conversion circuit 260.

Meanwhile, in the case where the comparison result CMPn is at a high level (i.e., in the second drive mode), the negative-side control circuit 226 outputs the low-level control signals UPn1 and UPn2. Further, the negative-side control circuit 226 outputs a PWMa signal as the control signal DWn1 and outputs a PWMb signal as the control signal DWn2. By these control signals, step-down is performed in the negative-side voltage conversion circuit 260.

Figure 17:
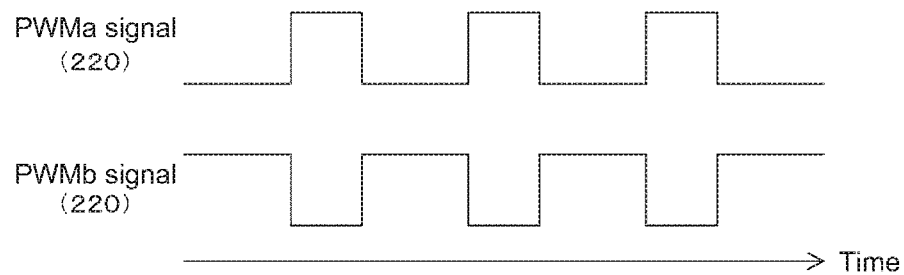
FIG. 17 is a timing chart showing an example of a pulse width modulation signal in the second embodiment of the present technology.

FIG. 17 is a timing chart showing an example of a pulse width modulation signal in the second embodiment of the present technology. As illustrated in FIG. 17, the phase of the PWMb signal is opposite to the phase of the PWMa signal.

As described above, in accordance with the second embodiment of the present technology, since the step-down-side transistor 253 is disposed instead of the step-down-side diode 252 in the positive-side voltage conversion circuit 230, it is possible to produce the first driving step-down circuit 250 more easily than in the case where the first driving step-down circuit 250 includes a diode and a transistor.

3. Third Embodiment

In the above-mentioned second embodiment, the booster-side diode 241 and the booster-side transistors 242 and 243 have been disposed in the second driving booster circuit 240. However, as the number of piezoelectric actuators 121 increases, also the number of second driving booster circuits 240 increases. Similarly, also the number of first driving booster circuits 270 increases. For this reason, the circuit scale of the drive circuit 200 becomes large. This second driving booster circuit 240 in a third embodiment is different from that in the second embodiment the number of booster-side diodes 241 is reduced.

Figure 18:
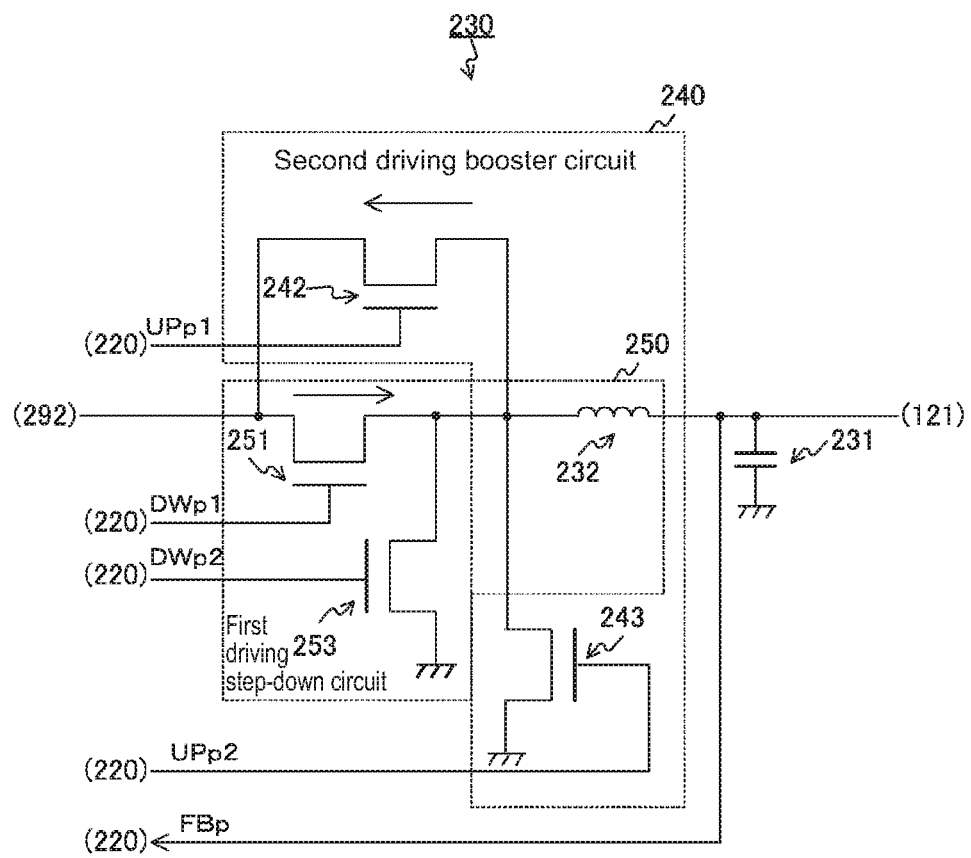
FIG. 18 is a circuit diagram showing a configuration example of a positive-side voltage conversion circuit in a third embodiment of the present technology.

FIG. 18 is a circuit diagram showing a configuration example of the positive-side voltage conversion circuit 230 in the third embodiment of the present technology. This the positive-side voltage conversion circuit 230 in the third embodiment is different from that in the second embodiment in that the booster-side diode 241 is not disposed.

Figure 19:
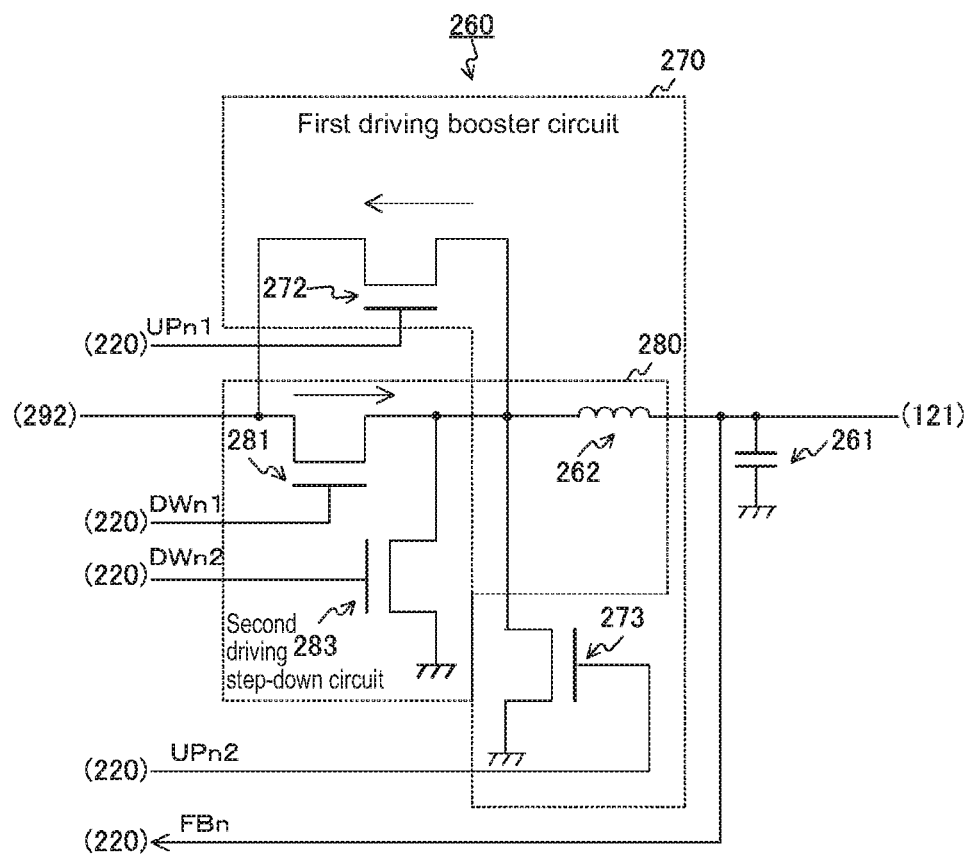
FIG. 19 is a circuit diagram showing a configuration example of a negative-side voltage conversion circuit in a third embodiment of the present technology.

FIG. 19 is a circuit diagram showing a configuration example of the negative-side voltage conversion circuit 260 in the third embodiment of the present technology. This negative-side voltage conversion circuit 260 in the third embodiment is different from that in the second embodiment in that the booster-side diode 271 is not disposed.

FIG. 20 is a diagram showing an example of an operation of the positive-side control circuit 223 in the third embodiment of the present technology.

In the case where the comparison result CMPp is at a low level (i.e., in the second drive mode), the positive-side control circuit 223 outputs the low-level control signals DWp1 and DWp2. Further, the positive-side control circuit 223 outputs a PWMb signal as the control signal UPp1 and outputs a PWMa signal as the control signal UPp2. By these control signals, boosting is performed.

Meanwhile, in the case where the comparison result CMPp is at a high level (i.e., in the first drive mode), the positive-side control circuit 223 outputs the low-level control signals UPp1 and UPp2. Further, the positive-side control circuit 223 outputs a PWMa signal as the control signal DWp1 and outputs a PWMb signal as the control signal DWp2. By these control signals, step-down is performed.

FIG. 21 is a diagram showing an example of an operation of the negative-side control circuit 226 in the third embodiment of the present technology.

In the case where the comparison result CMPn is at a low level (i.e., in the first drive mode), the negative-side control circuit 226 outputs the low-level control signals DWn1 and DWn2. Further, the negative-side control circuit 226 outputs a PWMb signal as the control signal UPn1 and outputs a PWMa signal as the control signal UPn2. By these control signals, boosting is performed.

Meanwhile, in the case where the comparison result CMPn is at a high level (i.e., in the second drive mode), the negative-side control circuit 226 outputs the low-level control signals UPn1 and UPn2. Further, the negative-side control circuit 226 outputs a PWMa signal as the control signal DWn1 and a PWMb signal as the control signal DWn2. By these control signals, step-down is performed.

As described above, in the third embodiment of the present technology, since the number of booster-side diodes 241 is reduced, it is possible to reduce the circuit scale of the drive circuit 200.

4. Fourth Embodiment

In the above-mentioned first embodiment, the inductor 232, the booster-side diode 241, the booster-side transistors 242 and 243, the step-down-side transistor 251, and the step-down-side diode 252 have been disposed in the positive-side voltage conversion circuit 230. However, as the number of piezoelectric actuators 121 increases, also the number of positive-side voltage conversion circuits 230 increases. Similarly, also the number of first driving booster circuits 270 increases. Therefore, the circuit scale of the drive circuit 200 becomes large. This second driving booster circuit 240 according to a fourth embodiment is different from that in the first embodiment in that the number of transistors and the number of diodes are reduced.

Figure 22:
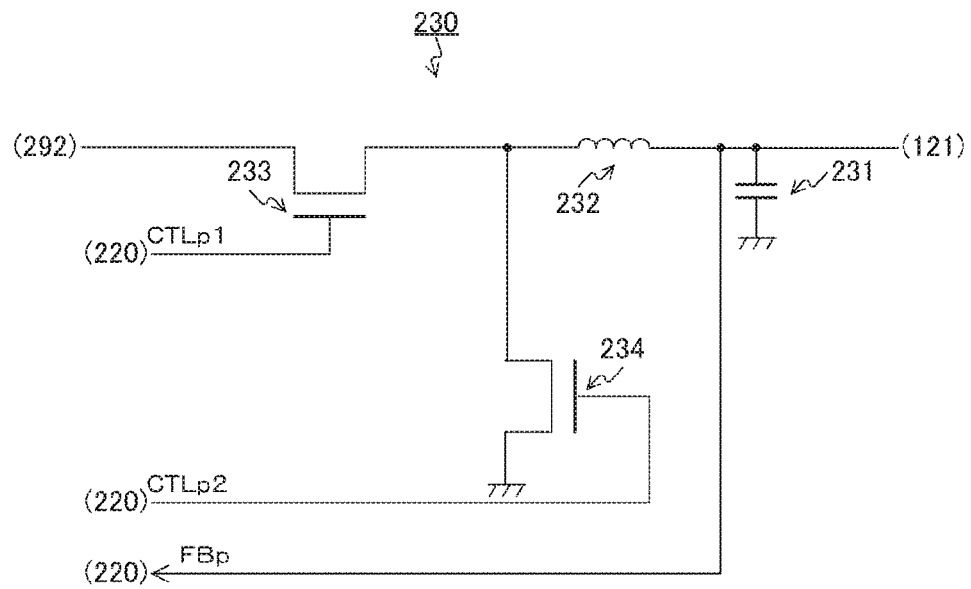
FIG. 22 is a circuit diagram showing a configuration example of a positive-side voltage conversion circuit in a fourth embodiment of the present technology.

FIG. 22 is a circuit diagram showing a configuration example of the positive-side voltage conversion circuit 230 in the fourth embodiment of the present technology. This positive-side voltage conversion circuit 230 in the fourth embodiment includes transistors 233 and 234 instead of the booster-side diode 241, the booster-side transistors 242 and 243, the step-down-side transistor 251, and the step-down-side diode 252. As the transistors 233 and 234, for example, nMOSa transistors are used.

The source and drain of the transistor 233 are connected to one end of the inductor 232 and the node 292, and a control signal CTLp1 from the control circuit 220 is input to the gate of the transistor 233. Further, the source and drain of the transistor 234 is connected to one end of the inductor 232 and a ground terminal, and a control signal CTLp2 from the control circuit 220 is input to the gate of the transistor 234.

Figure 23:
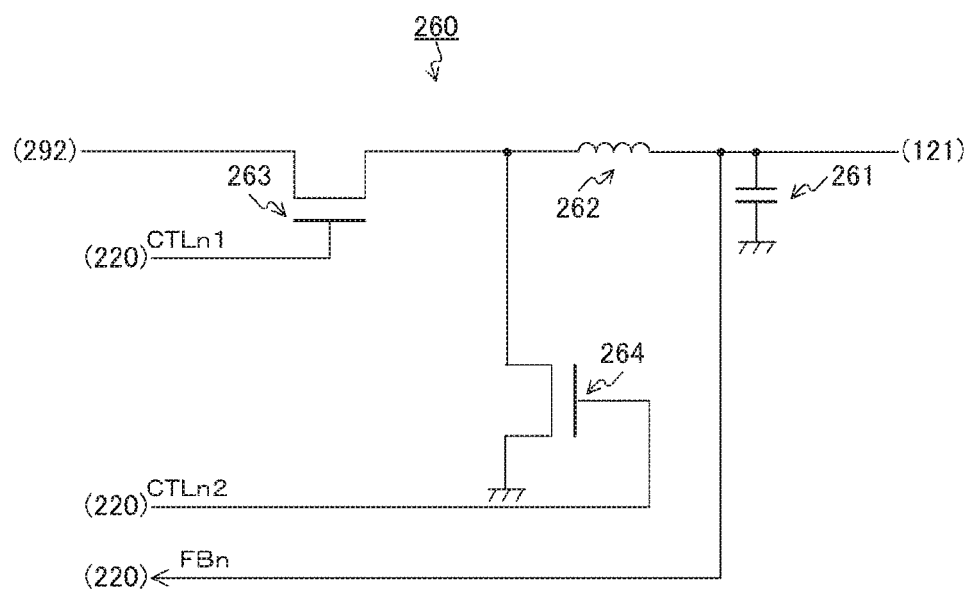
FIG. 23 is a circuit diagram showing a configuration example of a negative-side voltage conversion circuit in the fourth embodiment of the present technology.

FIG. 23 is a circuit diagram showing a configuration example of the negative-side voltage conversion circuit 260 in the fourth embodiment of the present technology. The negative-side voltage conversion circuit 260 in this fourth embodiment includes transistors 263 and 264 instead of the booster-side diode 271, the booster-side transistors 272 and 273, the step-down-side transistor 281, and the step-down-side diode 282. The connection configuration of the transistors 263 and 264 is similar to that of the positive-side voltage conversion circuit 230.

FIG. 24 is a diagram showing an example of an operation of the positive-side control circuit 223 in the fourth embodiment of the present technology.

In the case where the comparison result CMPp is at a low-level (i.e., in the second drive mode), the positive-side control circuit 223 outputs a PWMb signal as the control signal CTLp1 and outputs a PWMa signal as the control signal CTLp2. By these control signals, boosting is performed.

Meanwhile, in the case where the comparison result CMPp is at a high level (i.e., in the first drive mode), the positive-side control circuit 223 outputs a PWMa signal as the control signal CTLp1 and outputs a PWMb signal as the control signal CTLp2. By these control signals, step-down is performed.

FIG. 25 is a diagram showing an example of an operation of the negative-side control circuit 226 in the fourth embodiment of the present technology.

In the case where the comparison result CMPn is at a low level (i.e., in the first drive mode), the negative-side control circuit 226 outputs a PWMb signal as a control signal CTLn1 and outputs a PWMa signal as a control signal CTLn2. By these control signals, boosting is performed.

Meanwhile, in the case where the comparison result CMPn is at a high-level (i.e., in the second drive mode), the negative-side control circuit 226 outputs a PWMa signal as the control signal CTLn1 and outputs a PWMb signal as the control signal CTLn2. By these control signals, step-down is performed.

As described above, in the fourth embodiment of the present technology, since the positive-side control circuit 223 performs boosting and step-down by the transistors 233 and 234 and the inductor 232, it is possible to reduce the circuit scale as compared with the configuration in which three transistors and two diodes are disposed.

5. Application Example

The technology according to the present disclosure is appliable to a technology called IoT (Internet of things) which is a so-called "Internet of things". IoT is a mechanism in which an IoT device 9100, which is a "thing", is connected to another IoT device 9003, the Internet, a cloud 9005, or the like and they transmit/receive information to/from each other to control each other. IoT can be used in various industries such as agriculture, homes, automobiles, production, distribution, and energy.

Figure 26:
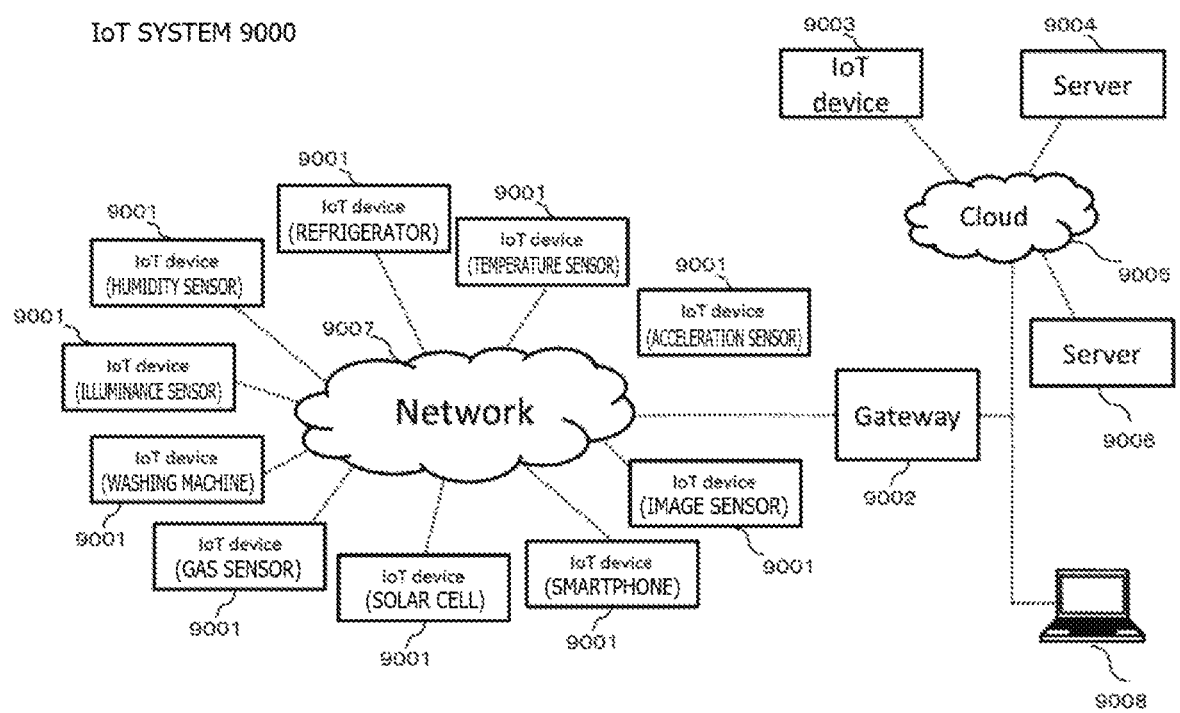
FIG. 26 is a diagram showing an example of a schematic configuration of an IoT system 9000 to which the technology according to the present disclosure can be applied.

FIG. 26 is a diagram illustrating an example of a schematic configuration of an IoT system 9000 to which the technology according to an embodiment of the present disclosure is applicable.

The IoT devices 9001 include a variety of sensors such as temperature, humidity, illuminance, acceleration, distance, image, gas, and human sensors. Further, the IoT devices 9001 may additionally include terminals such as a smartphone, a mobile phone, a wearable terminal, and a gaming device. The IoT devices 9001 are powered, for example, by an alternating current (AC) power supply, a direct current (DC) power supply, a battery, a non-contact power supply, energy harvesting or the like. The IoT devices 9001 are capable, for example, of wired, wireless, and short-range wireless communication. Communication schemes suitably used are third-generation (3G)/LTE, wireless fidelity (Wi-Fi), institute of electrical and electronic engineers (IEEE) 802.15.4, Bluetooth, Zigbee, and Z-Wave. The IoT devices 9001 may switch between the plurality of these communication sections to achieve communication.

The IoT devices 9001 may form one-to-one, star, tree, and mesh networks. The IoT devices 9001 may connect to the external cloud 9005 directly or via a gateway 9002. An address is assigned to each of the IoT devices 9001, for example, by internet protocol version (IPv) 4, IPv6, or IPv6 over low power wireless personal area networks (6Low-PAN). Data collected from the IoT devices 9001 is sent to the other IoT device 9003, a server 9004, the cloud 9005, and so on. The timings and frequency for sending data from the IoT devices 9001 may be suitably adjusted for transmission of data in a compressed form. Such data may be used in an 'as-is' manner or analyzed by a computer 9008 by various sections such as statistical analysis, machine learning, data mining, cluster analysis, discriminant analysis, combinational analysis, and chronological analysis. Such use of data enables provision of numerous services including control, warning, monitoring, visualization, automation, and optimization.

The technology according to an embodiment of the present disclosure is also applicable to home-related devices and services. The IoT devices 9001 in homes include washing machine, drying machine, dryer, microwave oven, dish washing machine, refrigerator, oven, electric rice cooker, cooking appliances, gas appliances, fire alarm, thermostat, air-conditioner, television (TV) set, recorder, audio appliances, lighting appliances, electric water heater, hot water dispenser, vacuum cleaner, electric fan, air purifier, security camera, lock, door-shutter opener/closer, sprinkler, toilet, thermometer, weighing scale, sphygmomanometer and the like. Further, the IoT devices 9001 may include solar cell, fuel cell, storage battery, gas meter, electric power meter, and distribution panel.

A low power consumption communication scheme is desirable as a communication scheme for the IoT devices 9001 in homes. Further, the IoT devices 9001 may communicate by Wi-Fi indoors and by 3G/LTE outdoors. An external server 9006 designed to control IoT devices may be provided on the cloud 9005 to control the IoT devices 9001. The IoT devices 9001 send data including statuses of home appliances, temperature, humidity, power consumption, and presence or absence of humans and animals indoors and outdoors. Data sent from the home appliances is accumulated in the external server 9006 via the cloud 9005. New services are made available based on such data. The IoT devices 9001 designed as described above can be controlled by voice using voice recognition technologies.

In addition, direct transmission of information from the home appliances to the TV set permits visualization of the statuses of the home appliances. Further, determination of whether or not the resident is at home and transmission of data to air-conditioners and lighting appliances by various sensors makes it possible to turn the power thereof on and off. Still further, advertisements can be shown on the displays provided to various home appliances via the Internet.

An example of the IoT system 9000 to which the technology of the present disclosure can be applied has been described. The technology according to the present disclosure can be suitably applied to the IoT device 9001 among the configurations described above. Specifically, the electronic apparatus 100 can be applied to the IoT device 9001. By applying the technology according to the present disclosure to the IoT device 9001, it is possible to reduce power consumption and lengthen the drive time of the battery of the IoT device 9001.

Note that the above-mentioned embodiments show an example for embodying the present technology, and the matters in the embodiments and the matters specifying the invention in the claims have a correspondence relationship. Similarly, the matters specifying the invention in the claims and the matters having the same names in the embodiments of the present technology have a correspondence relationship. However, the present technology is not limited to the embodiments and can be embodied by making various modifications without departing from the essence of the present technology.

It should be noted that the present technology may take the following configurations.

(1) A drive circuit, including:
a positive-side circuit that causes current supplied from a power source to a predetermined node to flow to a positive-side terminal of the capacitive load in a first drive mode and causes current from the capacitive load to flow from the positive-side terminal to the predetermined node in a second drive mode; and
a negative-side circuit that causes current from a negative-side terminal of the capacitive load to flow to the predetermined node in the first drive mode and causes current supplied from the power supply to the predetermined node to flow to the negative-side terminal in the second drive mode.
(2) The drive circuit according to (1), in which
the positive-side circuit steps-down voltage of the predetermined node and supplies the stepped-down voltage to the positive-side terminal in the first drive mode and boosts voltage of the positive-side terminal and supplies the boosted voltage to the predetermined node in the second drive mode, and
the negative-side circuit boosts voltage of the negative-side terminal and supplies the boosted voltage to the predetermined node in the first drive mode and steps-down the voltage of the predetermined node and supplies the stepped-down voltage to the negative-side terminal.
(3) The drive circuit according to (2), in which
each of the positive-side circuit and the negative-side circuit includes a chopper circuit that boosts and steps-down voltage.
(4) The drive circuit according to (3), in which
the chopper circuit includes a booster circuit and a step-down circuit, and
the booster circuit includes
an inductor whose one end is connected to one of the positive-side terminal and the negative-side terminal,
a booster-side diode having an output terminal connected to the predetermined node,
a first booster-side transistor that connects, where voltage is to be boosted, a different end of the inductor and an input terminal of the booster-side diode, and
a second booster-side transistor whose source and drain are connected to the different end of the inductor and a ground terminal, a predetermined pulse width modulation signal being input, where voltage is to be boosted, to a gate of the second booster-side transistor.
(5) The drive circuit according to (3) or (4), in which
the chopper circuit includes a booster circuit and a step-down circuit, and
the step-down circuit includes
an inductor whose one end is connected to one of the positive-side terminal and the negative-side terminal,
a step-down-side diode having an output terminal connected to a different end of the inductor,
a step-down-side transistor whose source and drain are connected to the different end of the inductor and the predetermined node, a pulse width modulation signal being input, where voltage is to be stepped-down, to a gate of the step-down-side transistor.
(6) The drive circuit according to (3) or (4), in which
the chopper circuit includes a booster circuit and a step-down circuit, and
the step-down circuit includes
an inductor whose one end is connected to one of the positive-side terminal and the negative-side terminal,
a first step-down-side transistor whose source and drain are connected to a different end of the inductor and the predetermined node, a first pulse width modulation signal being input, where voltage is to be stepped-down, to a gate of the first step-down-side transistor, and
a second step-down-side transistor whose source and drain are connected to the different end of the inductor and a ground terminal, a second pulse width modulation signal having a phase opposite to that of the first pulse width modulation signal being input, where voltage is to be stepped-down, to a gate of the second step-down-side transistor.
(7) The drive circuit according to (3), in which
the chopper circuit includes a booster circuit and a step-down circuit, and
the booster circuit includes
an inductor whose one end is connected to one of the positive-side terminal and the negative-side terminal,
a first booster-side transistor whose source and drain are connected to a different end of the inductor and a ground terminal, a first pulse width modulation signal being input, where voltage is to be boosted, to a gate of the first booster-side transistor, and
a second booster-side transistor whose source and drain are connected to the different end of the inductor and the predetermined node, a second pulse width modulation signal having a phase opposite to that of the first pulse width modulation signal being input, where voltage is to be boosted, to a gate of the second booster-side transistor.
(8) The drive circuit according to (3), in which
the chopper circuit includes
an inductor whose one end is connected to one of the positive-side terminal and the negative-side terminal,
a first transistor whose source and drain are connected to a different end of the inductor and the predetermined node, a first pulse width modulation signal being input to the first transistor, and
a second transistor whose source and drain are connected to the different end of the inductor and a ground terminal, a second pulse width modulation signal having a phase opposite to that of the first pulse width modulation signal being input to the second transistor.
(9) The drive circuit according to any one of (3) to (8), in which
the chopper circuit further includes
a positive-side capacitor whose one end is connected to the positive-side terminal, and
a negative-side capacitor whose one end is connected to the negative-side terminal.
(10) An electronic apparatus, including:
a capacitive load;
a positive-side circuit that causes current supplied from a power source to a predetermined node to flow to a positive-side terminal of the capacitive load in a first drive mode and causes current from the capacitive load to flow from the positive-side terminal to the predetermined node in a second drive mode; and
a negative-side circuit that causes current from a negative-side terminal of the capacitive load to flow to the predetermined node in the first drive mode and causes current supplied from the power supply to the predetermined node to flow to the negative-side terminal in the second drive mode.

(11) A method of controlling a drive circuit, including:
a positive-side control procedure of causing current supplied from a power source to a predetermined node to flow to a positive-side terminal of the capacitive load in a first drive mode and causing current from the capacitive load to flow from the positive-side terminal to the predetermined node in a second drive mode; and
a negative-side control procedure of causing current from a negative-side terminal of the capacitive load to flow to the predetermined node in the first drive mode and causing current supplied from the power supply to the predetermined node to flow to the negative-side terminal in the second drive mode.

REFERENCE SIGNS LIST 100 electronic apparatus
110 battery
120 capacitive load
121 piezoelectric actuator
200 drive circuit
210 power-source-side booster circuit
220 control circuit
221, 224 amplifier
222, 225 comparator
223 positive-side control circuit
226 negative-side control circuit
230 positive-side voltage conversion circuit
231, 261, 291 capacitor
232, 262 inductor
233, 234, 263, 264 transistor
240 discharge booster circuit
241, 271 booster-side diode
242, 243, 272, 273 booster-side transistor
250 charging step-down circuit
251, 253, 281, 283 step-down-side transistor
252, 282 step-down-side diode
260 negative-side voltage conversion circuit
270 charging booster circuit
280 discharge step-down circuit
9001 IoT device

The invention claimed is:

1. A drive circuit, comprising:
a positive-side circuit configured to:
control current supplied from a power source to a node to flow to a positive-side terminal of a capacitive load in a first drive mode; and
control current from the positive-side terminal of the capacitive load to flow to the node in a second drive mode; and
a negative-side circuit configured to:
control current from a negative-side terminal of the capacitive load to flow to the node in the first drive mode; and
control the current supplied from the power source to the node to flow to the negative-side terminal in the second drive mode,
wherein current flow between the capacitive load and the node is bidirectional.

2. The drive circuit according to claim 1, wherein the positive-side circuit is further configured to:
step-down voltage of the node and supply the stepped-down voltage to the positive-side terminal in the first drive model; and
boost voltage of the positive-side terminal and supply the boosted voltage to the node in the second drive mode, and the negative-side circuit is further configured to:
boost voltage of the negative-side terminal and supply the boosted voltage to the node in the first drive model and
step-down the voltage of the node and supply the stepped-down voltage to the negative-side terminal.

3. The drive circuit according to claim 2, wherein
each of the positive-side circuit and the negative-side circuit includes a chopper circuit configured to boost and step-down voltage.

4. The drive circuit according to claim 3, wherein
the chopper circuit includes:
a booster circuit; and
a step-down circuit, and
the booster circuit includes:
an inductor, wherein a first end of the inductor is connected to one of the positive-side terminal or the negative-side terminal;
a booster-side diode having an output terminal connected to the node;
a first booster-side transistor connected to a second end of the inductor and an input terminal of the booster-side diode; and
a second booster-side transistor, wherein
a source of the second booster-side transistor is connected to the second end of the inductor,
a drain of the second booster-side transistor is connected to a ground terminal, and
a pulse width modulation signal is input, where voltage is to be boosted, to a gate of the second booster-side transistor.

5. The drive circuit according to claim 3, wherein
the chopper circuit includes:
a booster circuit; and
a step-down circuit, and
the step-down circuit includes:
an inductor, wherein a first end of the inductor is connected to one of the positive-side terminal or the negative-side terminal;
a step-down-side diode having an output terminal connected to a second end of the inductor;
a step-down-side transistor, wherein
a source of the step-down-side transistor is connected to the second end of the inductor,
a drain of the step-down-side transistor is connected to the node, and
a pulse width modulation signal is input, where voltage is to be stepped-down, to a gate of the step-down-side transistor.

6. The drive circuit according to claim 3, wherein
the chopper circuit includes:
a booster circuit; and
a step-down circuit, and
the step-down circuit includes:
an inductor, wherein a first end of the inductor is connected to one of the positive-side terminal or the negative-side terminal;
a first step-down-side transistor, wherein
a source of the first step-down-side transistor is connected to a second end of the inductor,
a drain of the first step-down-side transistor is connected to the node, and
a first pulse width modulation signal is input, where voltage is to be stepped-down, to a gate of the first step-down-side transistor; and
a second step-down-side transistor, wherein
a source of the second step-down-side transistor is connected to the second end of the inductor, a drain of the second step-down-side transistor is connected to a ground terminal,
a second pulse width modulation signal is input, where voltage is to be stepped-down, to a gate of the second step-down-side transistor, and
a phase of the second pulse width modulation signal is opposite to a phase of the first pulse width modulation signal.

7. The drive circuit according to claim 3, wherein the chopper circuit includes:
a booster circuit; and
a step-down circuit, and
the booster circuit includes:
an inductor, wherein a first end of the inductor is connected to one of the positive-side terminal or the negative-side terminal;
a first booster-side transistor, wherein
a source of the first booster-side transistor is connected to a second end of the inductor,
a drain of the first booster-side transistor is connected to a ground terminal, and
a first pulse width modulation signal is input, where voltage is to be boosted, to a gate of the first booster-side transistor; and a second booster-side transistor, wherein
a source of the second booster-side transistor is connected to the second end of the inductor,
a drain of the second booster-side transistor is connected to the node,
a second pulse width modulation signal is input, where voltage is to be boosted, to a gate of the second booster-side transistor, and
a phase of the second pulse width modulation signal is opposite to a phase of the first pulse width modulation signal.

8. The drive circuit according to claim 3, wherein the chopper circuit includes:
an inductor, wherein a first end of the inductor is connected to one of the positive-side terminal or the negative-side terminal;
a first transistor, wherein
a source of the first transistor is connected to a second end of the inductor,
a drain of the first transistor is connected to the node, and
a first pulse width modulation signal is input to the first transistor; and
a second transistor, wherein
a source of the second transistor is connected to the second end of the inductor, a drain of the second transistor is connected to a ground terminal,
a second pulse width modulation signal is input to the second transistor, and
a phase of the second pulse width modulation signal is opposite to a phase of the first pulse width modulation signal.

9. The drive circuit according to claim 3, wherein the chopper circuit further includes:
a positive-side capacitor whose one end is connected to the positive-side terminal; and
a negative-side capacitor whose one end is connected to the negative-side terminal.

10. An electronic apparatus, comprising:
a capacitive load;
a positive-side circuit configured to:
control current supplied from a power source to a node to flow to a positive-side terminal of the capacitive load in a first drive mode, and
control current from the positive-side terminal of the capacitive load to flow to the node in a second drive mode; and
a negative-side circuit configured to:
control current from a negative-side terminal of the capacitive load to flow to the node in the first drive mode, and
control the current supplied from the power source to the node to flow to the negative-side terminal in the second drive mode,
wherein current flow between the capacitive load and the node is bidirectional.

11. A method of controlling a drive circuit, the method comprising:
controlling, by a positive-side circuit, current supplied from a power source to a node to flow to a positive-side terminal of a capacitive load in a first drive mode;
controlling, by the positive-side circuit, current from the positive-side terminal of the capacitive load to flow to the node in a second drive mode;
controlling, by a negative-side circuit, current from a negative-side terminal of the capacitive load to flow to the node in the first drive model; and
controlling, by the negative-side circuit, current supplied from the power source to the node to flow to the negative-side terminal in the second drive mode,
wherein current flow between the capacitive load and the node is bidirectional.

* * * * *